(12) United States Patent
Fuji

(10) Patent No.: US 11,647,136 B2
(45) Date of Patent: May 9, 2023

(54) MEDIUM-DISCHARGING DEVICE AND IMAGE READING APPARATUS

(71) Applicant: SEIKO EPSON CORPORATION, Tokyo (JP)

(72) Inventor: Keita Fuji, Nakama (JP)

(73) Assignee: Seiko Epson Corporation, Tokyo (JP)

( * ) Notice: Subject to any disclaimer, the term of this patent is extended or adjusted under 35 U.S.C. 154(b) by 98 days.

(21) Appl. No.: 17/443,985

(22) Filed: Jul. 29, 2021

(65) Prior Publication Data
US 2022/0038592 A1 Feb. 3, 2022

(30) Foreign Application Priority Data
Jul. 31, 2020 (JP) .............................. JP2020-130367

(51) Int. Cl.
*H04N 1/00* (2006.01)

(52) U.S. Cl.
CPC ....... *H04N 1/00631* (2013.01); *H04N 1/0066* (2013.01); *H04N 1/00612* (2013.01)

(58) Field of Classification Search
CPC .......... H04N 1/00631; H04N 1/00612; H04N 1/0066
USPC ....................................................... 358/400
See application file for complete search history.

(56) References Cited

U.S. PATENT DOCUMENTS

| | | | | |
|---|---|---|---|---|
| 6,178,017 B1* | 1/2001 | Ishida | ............... | H04N 1/00588 358/496 |
| 6,428,000 B1* | 8/2002 | Hara | ...................... | B65H 31/20 271/223 |
| 2002/0050681 A1* | 5/2002 | Hosaka | .................. | B65H 37/04 271/207 |
| 2014/0103603 A1* | 4/2014 | Horita | ..................... | B65H 1/00 271/171 |
| 2016/0159588 A1* | 6/2016 | Mizuguchi | ......... | G03G 21/1633 271/147 |
| 2018/0257895 A1 | 9/2018 | Kaneko et al. | | |
| 2021/0094781 A1* | 4/2021 | Yoshida | ................. | B65H 31/20 |

FOREIGN PATENT DOCUMENTS

JP 2018-039661 A 3/2018

* cited by examiner

*Primary Examiner* — Gabriel I Garcia
(74) *Attorney, Agent, or Firm* — Workman Nydegger

(57) ABSTRACT

A medium-discharging device includes: a discharging section that discharges a medium; a stacker that is configured to stack the medium on a mounting surface and, in a closed state, has the mounting surface facing the housing section; and a first stopper and a second stopper that are configured to switch between a regulating state in which the stopper is in contact with a leading end of the medium and a stored state in which the stopper is stored in the stacker, in which the second stopper is provided at a position which is between the discharging section and the first stopper and at which the second stopper faces the recess when the stacker is in the closed state, and at least a portion of the second stopper enters the recess when the second stopper is in the stored state and when the stacker is in the closed state.

11 Claims, 17 Drawing Sheets

FIG. 7
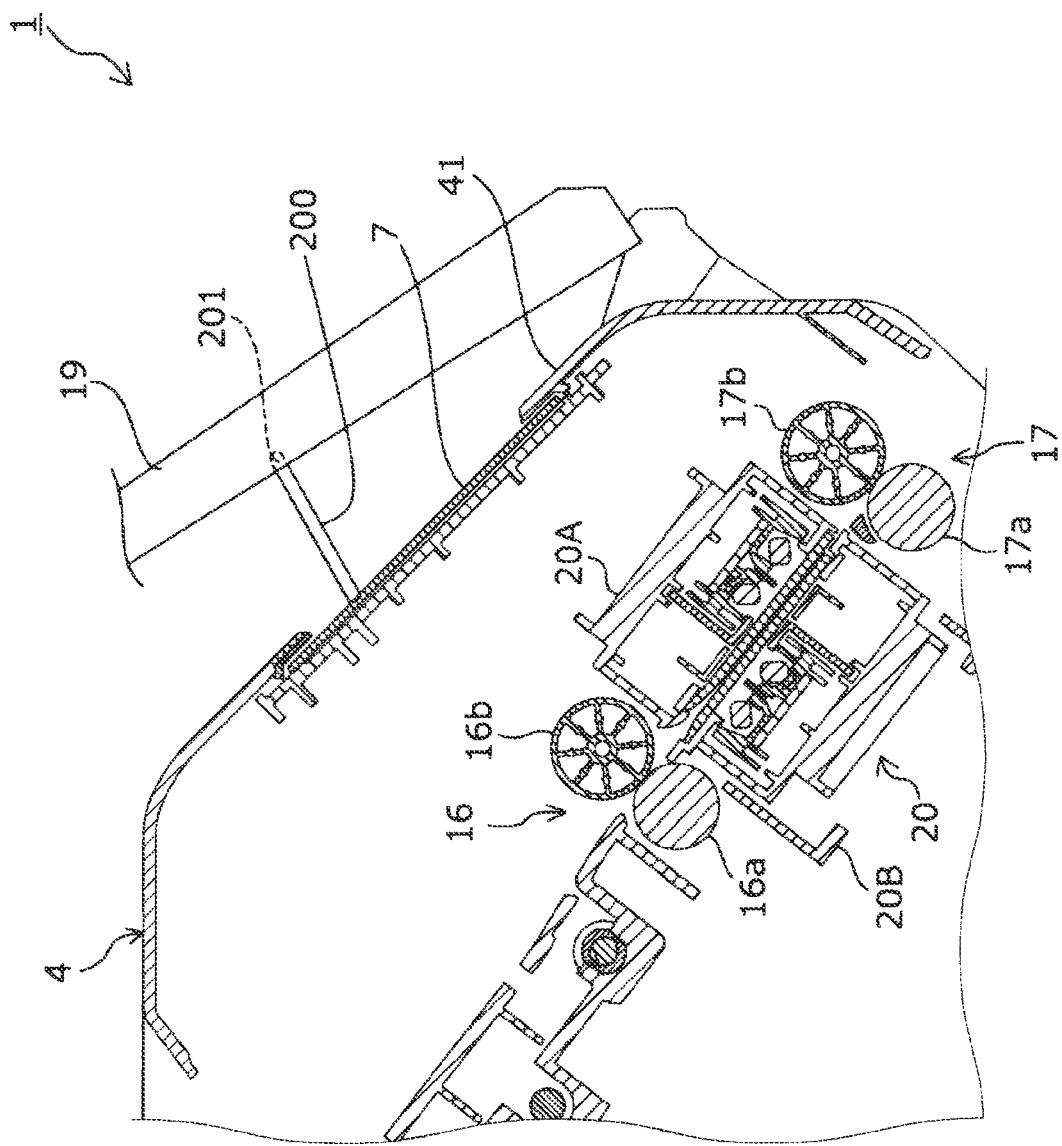
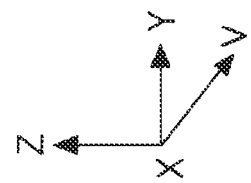

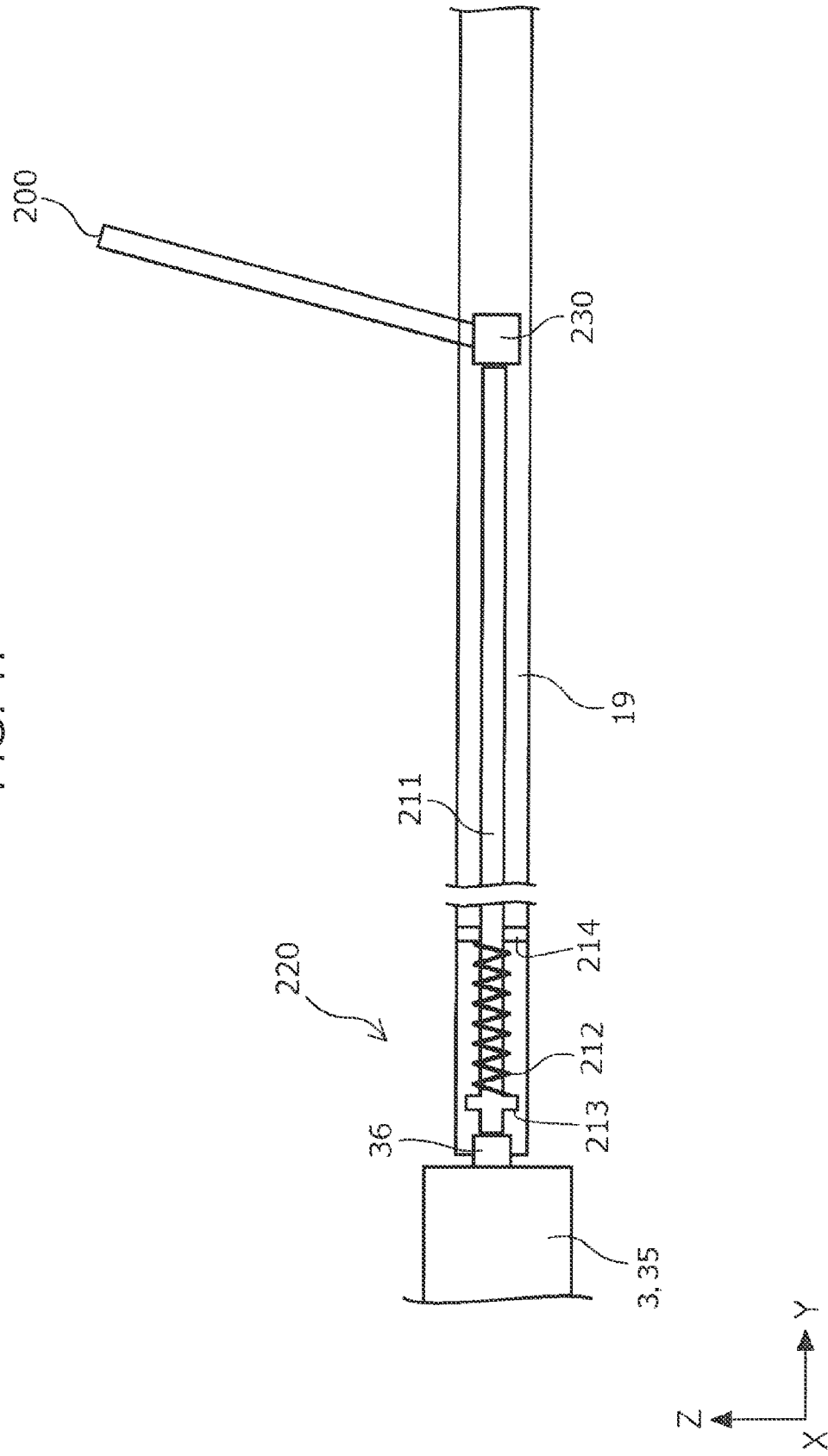

MEDIUM-DISCHARGING DEVICE AND IMAGE READING APPARATUS

The present application is based on, and claims priority from JP Application Serial Number 2020-130367, filed Jul. 31, 2020, the disclosure of which is hereby incorporated by reference herein in its entirety.

BACKGROUND

1. Technical Field

The present disclosure relates to a medium-discharging device and an image reading apparatus.

2. Related Art

Medium-discharging devices that have various configurations for stacking, on a stacker, media discharged from a discharging section are used. For example, JP-A-2018-39661 discloses an image reading apparatus that has a configuration in which sheets discharged from a discharging section are stacked on a discharge tray. To improve alignment performance of sheets stacked on the discharge tray, the image reading apparatus of JP-A-2018-39661 includes a discharged-paper stopper provided in a front-edge portion of the discharge tray.

In a configuration in which media discharged from a discharging section are stacked on a stacker, when a stopper that regulates movement of the media in a discharging direction is provided in the stacker, alignment performance of the media stacked on a discharge tray is improved. However, in a configuration in which a stopper is provided in a stacker as in the image reading apparatus of JP-A-2018-39661, in which the discharged-paper stopper is provided in the discharge tray, the thickness of the stacker in which the stopper is stored may increase the size of the apparatus.

SUMMARY

A medium-discharging device of the present disclosure to solve the aforementioned problem includes: a housing section including a recess; a discharging section that discharges a medium; a stacker that is configured to be opened/closed with respect to the housing section and that, in an open state, receives, on a mounting surface, the medium discharged from the discharging section and stacks the medium on the mounting surface and, in a closed state, has the mounting surface facing the housing section; and a stopper provided in the stacker and configured to switch between a regulating state in which the stopper is in contact with a leading end of the medium discharged from the discharging section in a discharging direction and thereby regulates a position of the medium in the discharging direction and a stored state in which the stopper is stored in the stacker, in which at least a portion of the stopper enters the recess when the stopper is in the stored state and when the stacker is in the closed state.

BRIEF DESCRIPTION OF THE DRAWINGS

FIG. 7 is a side sectional view of the apparatus main body of the scanner of Example 1 which illustrates a situation in which a stacker is being brought into a closed state from an open state while the second stopper is in a regulating state.

FIG. 17 schematically illustrates the moving section of the second stopper in the scanner of Example 3 and illustrates a state in which the second stopper is on a front-edge side.

DESCRIPTION OF EXEMPLARY EMBODIMENTS

Figure 1:
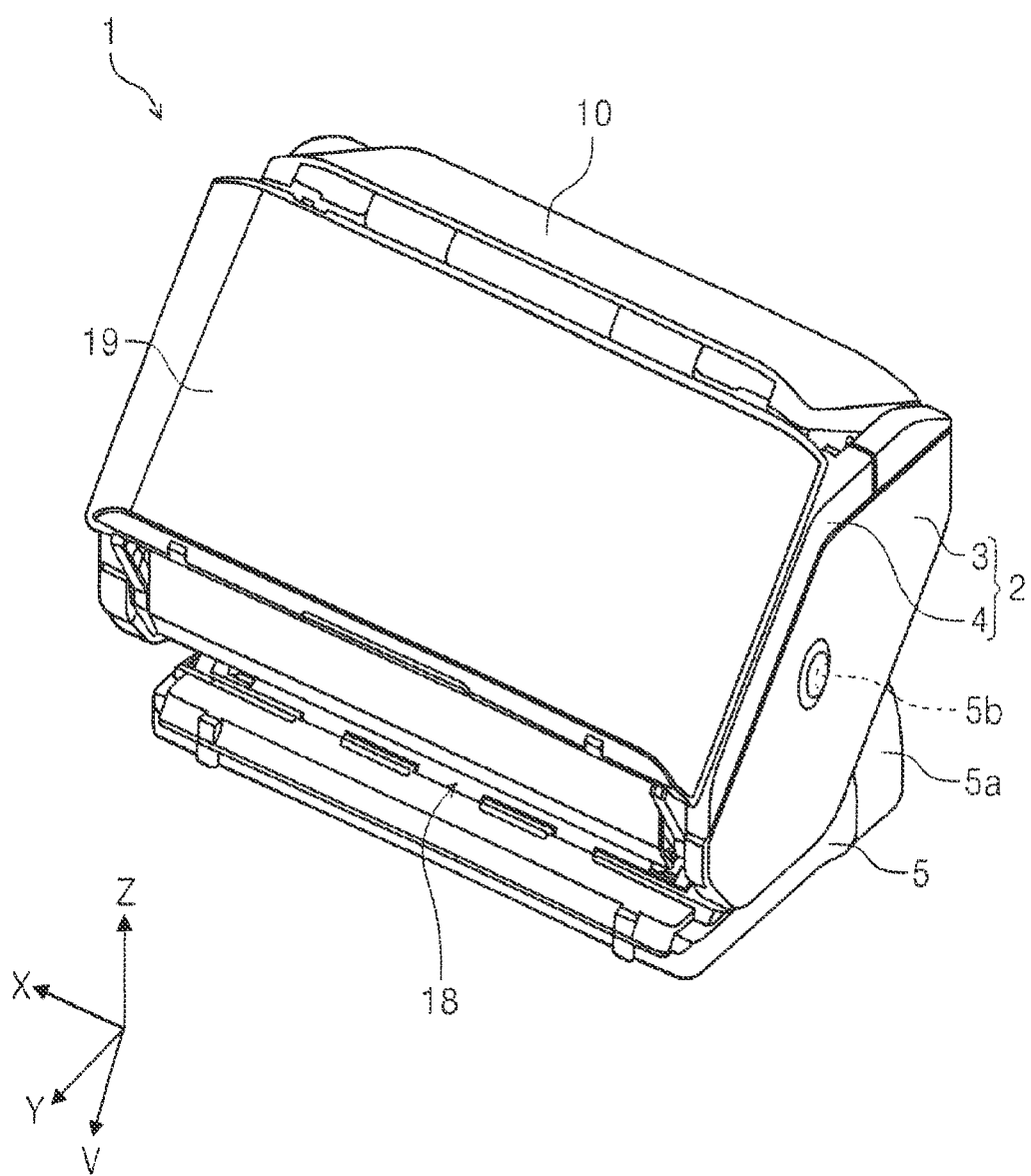
FIG. 1 is an external perspective view of a scanner of Example 1 viewed from the front side, in which an apparatus main body takes a second posture.

The disclosure will be schematically described below.

A medium-discharging device according to a first aspect includes: a housing section including a recess; a discharging section that discharges a medium; a stacker that is configured to be opened/closed with respect to the housing section and that, in an open state, receives, on a mounting surface, the medium discharged from the discharging section and stacks the medium on the mounting surface and, in a closed state, has the mounting surface facing the housing section; and a stopper provided in the stacker and configured to switch between a regulating state in which the stopper is in contact with a leading end of the medium discharged from the discharging section in a discharging direction and thereby regulates a position of the medium in the discharging direction and a stored state in which the stopper is stored in the stacker, in which at least a portion of the stopper enters the recess when the stopper is in the stored state and when the stacker is in the closed state.

According to the present aspect, the stopper is provided at a position at which the stopper faces the recess when the stacker is in the closed state, and at least a portion of the stopper enters the recess when the stopper is in the stored state and when the stacker is in the closed state. It is therefore possible to reduce the size of the medium-discharging device by utilizing the recess of the housing section.

The medium-discharging device according to a second aspect further includes, as the stopper: a first stopper provided in the stacker and configured to switch between a regulating state in which the first stopper is in contact with the leading end of the medium discharged from the discharging section in the discharging direction and thereby regulates the position of the medium in the discharging direction and a stored state in which the first stopper is stored in the stacker; and a second stopper provided in the stacker and configured to switch between a regulating state in which the second stopper is in contact with the leading end of the medium discharged from the discharging section in the discharging direction and thereby regulates the position of the medium in the discharging direction and a stored state in which the second stopper is stored in the stacker, in which the second stopper is provided at a position which is between the discharging section and the first stopper in the discharging direction and at which the second stopper faces the recess when the stacker is in the closed state, and at least a portion of the second stopper enters the recess when the second stopper is in the stored state and when the stacker is in the closed state, in the first aspect.

According to the present aspect, the second stopper is provided at the position at which the second stopper faces the recess when the stacker is in the closed state, and at least a portion of the second stopper enters the recess when the second stopper is in the stored state and when the stacker is in the closed state. It is therefore possible to reduce the size of the medium-discharging device by utilizing the recess of the housing section. Moreover, according to the present aspect, in addition to the first stopper, the second stopper is provided between the discharging section and the first stopper. Thus, by selectively using the first stopper or the second stopper, it is possible to determine, in accordance with a size of a medium to be used, whether to regulate the medium by using the first stopper or by using the second stopper. Accordingly, it is possible to stack media of various sizes on the stacker with excellent alignment performance.

In the medium-discharging device according to a third aspect, in the second aspect, an operation section of the medium-discharging device is provided in the recess.

According to the present aspect, the operation section of the medium-discharging device is provided in the recess. From the viewpoint of manufacture, for example, simplification and cost reduction of manufacture, when the operation section of the medium-discharging device is formed in the housing section, the operation section forms a recess in the housing section in many cases. Thus, it is possible to reduce the size of the medium-discharging device by effectively utilizing the recess formed when the operation section is formed in the housing section.

In the medium-discharging device according to a fourth aspect, in the second or third aspect, in an instance in which the stacker is switched from the open state to the closed state when the second stopper is retained in the regulating state, the second stopper comes into contact with the recess and prevents the stacker from being switched to the closed state.

According to the present aspect, in the instance in which the stacker is switched from the open state to the closed state when the second stopper is retained in the regulating state, the second stopper comes into contact with the recess and is able to prevent the stacker from being switched to the closed state. Thus, it is possible to suppress a user from switching the stacker from the open state to the closed state while retaining the second stopper in the regulating state without switching the second stopper to the stored state.

In the medium-discharging device according to a fifth aspect, in the second or third aspect, in an instance in which the stacker is switched from the open state to the closed state when the second stopper is retained in the regulating state, the second stopper comes into contact with the recess and thereby switches to the stored state.

According to the present aspect, in the instance in which the stacker is switched from the open state to the closed state when the second stopper is retained in the regulating state, the second stopper comes into contact with the recess and thereby switches to the stored state. Thus, when the user switches the stacker from the open state to the closed state while retaining the second stopper in the regulating state without switching the second stopper to the stored state, the second stopper is able to automatically switch to the stored state.

In the medium-discharging device according to a sixth aspect, in any of the second to fifth aspects, the stacker includes a first stacker and a second stacker, the first stopper is provided in the first stacker, and the second stopper is provided in the second stacker.

According to the present aspect, the first stacker and the second stacker are included, the first stopper is provided in the first stacker, and the second stopper is provided in the second stacker. It is thereby possible to determine distances from the discharging section to the first stopper and to the second stopper within a wide adjustment range.

The medium-discharging device according to a seventh aspect further includes a switching section that switches an angle of the discharging direction with respect to the stacker between a first angle and a second angle closer to horizontal than the first angle, in which the switching section changes, by switching the angle of the discharging direction between the first angle and the second angle, a distance from the discharging section to a regulating position at which the medium is regulated by the second stopper, in any of the second to fifth aspects.

According to the present aspect, by changing the angle of the discharging direction by the switching section, it is possible to appropriately set a distance to a position at which a leading end of a discharged document comes into contact with the stopper, thus making it possible to improve stackability obtained by the stopper.

In the medium-discharging device according to an eighth aspect, in the seventh aspect, a distance from the discharging section to the regulating position at which the medium is regulated by the second stopper at the first angle is longer than a distance from the discharging section to the regulating position at which the medium is regulated by the second stopper at the second angle.

According to the present aspect, by setting the distance from the discharging section to the regulating position at which the medium is regulated by the second stopper at the first angle to be longer than the distance from the discharging section to the regulating position at which the medium is regulated by the second stopper at the second angle, it is possible to simplify the configuration of the switching section.

The medium-discharging device according to a ninth aspect further includes, in the eighth aspect, a moving section that moves a position of the second stopper in the stacker.

According to the present aspect, the moving section that moves the position of the second stopper in the stacker is included. It is therefore possible to move the second stopper to an appropriate position, thus making it possible to stack media on the stacker with excellent alignment performance.

The medium-discharging device according to a tenth aspect further includes: a switching section that switches an angle of the discharging direction with respect to the stacker between a first angle and a second angle closer to horizontal than the first angle; a pivot shaft of the second stopper which is provided in an intersecting direction intersecting the discharging direction; and an angle adjusting section that adjusts an inclination angle of the second stopper with respect to the stacker when viewed in the intersecting direction, in which the angle adjusting section adjusts the inclination angle to a gentle angle in conjunction with switching of the angle of the discharging direction from the first angle to the second angle which is performed by the switching section, in any of the second to sixth aspects.

According to the present aspect, since the angle of the discharging direction is able to be switched between the first angle and the second angle closer to horizontal than the first angle, it is possible to switch the angle of the discharging direction between the first angle and the second angle in accordance with a type of a medium, thus making it possible to improve stackability of media. Moreover, the angle adjusting section adjusts the inclination angle to a gentle angle in conjunction with switching of the angle of the discharging direction from the first angle to the second angle which is performed by the switching section. It is therefore possible to suppress a stacking defect of media from occurring when the distance to the regulating position at which the media are regulated by the second stopper becomes short due to switching to the second angle.

An image reading apparatus according to an eleventh aspect includes: a reading unit that reads a surface of a medium; and the medium-discharging device according to any of the first to tenth aspects.

According to the present aspect, it is possible to reduce the size of the image reading apparatus by utilizing the recess of the housing section.

The disclosure will be specifically described below.

As an example of an image reading apparatus, a scanner 1 capable of reading at least one of a front surface and a rear surface of a document, which is an example of a medium, will be described below. The scanner 1 is a document scanner that reads a document while moving the document with respect to a reading unit.

Note that, in the X-Y-Z coordinate system illustrated in each drawing, the X-axis direction indicates an apparatus width direction and a document width direction. The Y-axis direction indicates an apparatus depth direction and a direction extending in the horizontal direction. The Z-axis direction indicates a direction extending in the vertical direction. The V-axis direction indicates a document transporting direction and a direction parallel to a document transporting path T described below, and, in particular, an angle formed by the V-axis direction and the Y-axis direction and an angle formed by the V-axis direction and the Z-axis direction vary in accordance with the posture of the apparatus. Moreover, the V-axis direction also corresponds substantially to a discharging direction of a medium, which is a document. In the present embodiment, a direction from the rear of the apparatus to the front of the apparatus is defined as a +Y direction, and a direction from the front of the apparatus to the rear of the apparatus is defined as a −Y direction. Moreover, when the apparatus is viewed from the front, a direction toward the left is defined as a +X direction, and a direction toward the right is defined as a −X direction. Furthermore, hereinafter, a direction (+V direction) in which a document is transported may be called "downstream", and a direction (−V direction) opposite thereto may be called "upstream".

EXAMPLE 1

First, the scanner 1 of Example 1 will be described with reference to FIGS. 1 to 13.

An overview of the scanner 1 of the present example will be provided below with reference to FIGS. 1 to 4C. In FIGS. 1 to 4C, the scanner 1 includes an apparatus main body 2 and a supporting base 5 that supports the apparatus main body 2 so as to be rotatable. The apparatus main body 2 is constituted by a lower unit 3 and an upper unit 4. As illustrated in FIGS. 4A to 4C, the upper unit 4 is provided so as to be openable/closable with respect to the lower unit 3 by rotating about a rotation shaft 30, and when the upper unit 4 is opened to the apparatus front side, a document transporting path T described below is exposed.

The lower unit 3 constituting the apparatus main body 2 is provided so as to be rotatable with respect to an arm section 5a, which constitutes the supporting base 5, about a rotation shaft 5b and is configured to be able to change its posture by rotating. The apparatus main body 2 of the scanner 1 of the present example is configured to be able to change its posture and to be able to retain three postures by using a posture retaining unit (not illustrated). Two of the three postures are postures for reading a document, and the remaining one is a posture when the apparatus is not in use. The postures illustrated in FIGS. 4B and 4C are each a posture for reading a document, and FIG. 4B illustrates a first reading posture and FIG. 4C illustrates a second reading posture. Moreover, FIG. 4A illustrates the posture when the apparatus is not in use. Regarding posture, the projected area of the scanner 1 on an installation surface is smallest when the apparatus is not in use. More specifically, regarding posture, the apparatus occupies the least space in the Y-axis direction when the apparatus is not in use.

The projected area in the first reading posture is larger than that in the posture when the apparatus is not in use, and the projected area in the second reading posture is larger than that in the first reading posture. Moreover, in the case of the first reading posture, the +V direction, which is the document transporting direction, is obliquely downward, and, in the case of the second reading posture, the +V direction is substantially horizontal. Note that, in the present embodiment, the +V direction in the second reading posture is substantially horizontal but is not necessarily limited to being horizontal, and the second reading posture may be a posture in which the +V direction is closer to horizontal than the +V direction in the first reading posture.

Each of the postures of the apparatus main body 2 is able to be retained by the retaining unit (not illustrated), and the configuration is such that the posture retaining state is able to be released by a release lever (not illustrated). Moreover, the configuration is such that each of the postures of the apparatus main body 2 is able to be detected by a posture detecting section (not illustrated).

Figure 2:
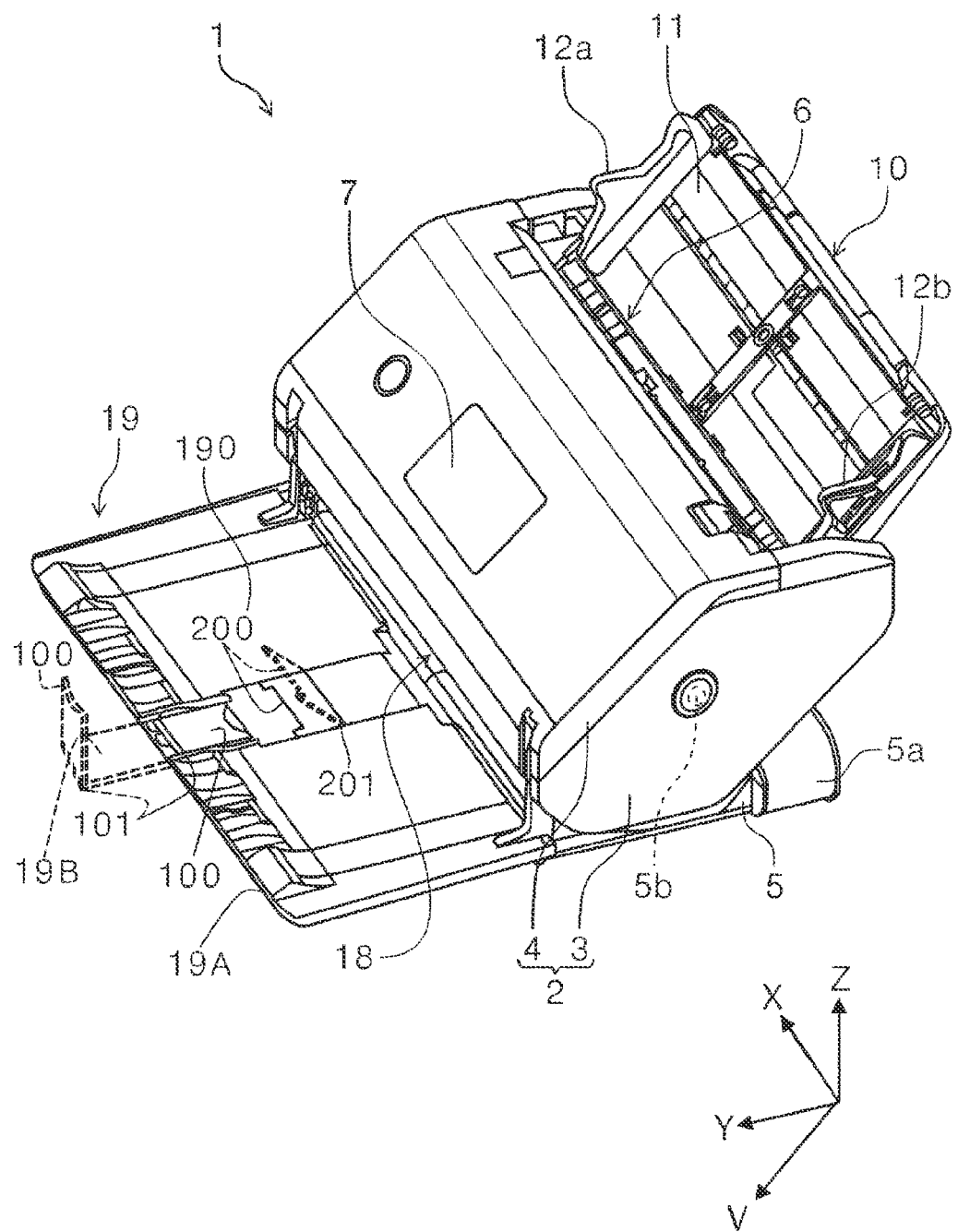
FIG. 2 is an external perspective view of the scanner of Example 1 viewed from the front side, in which the apparatus main body takes the second posture and in which a front cover is open.
Figure 12:
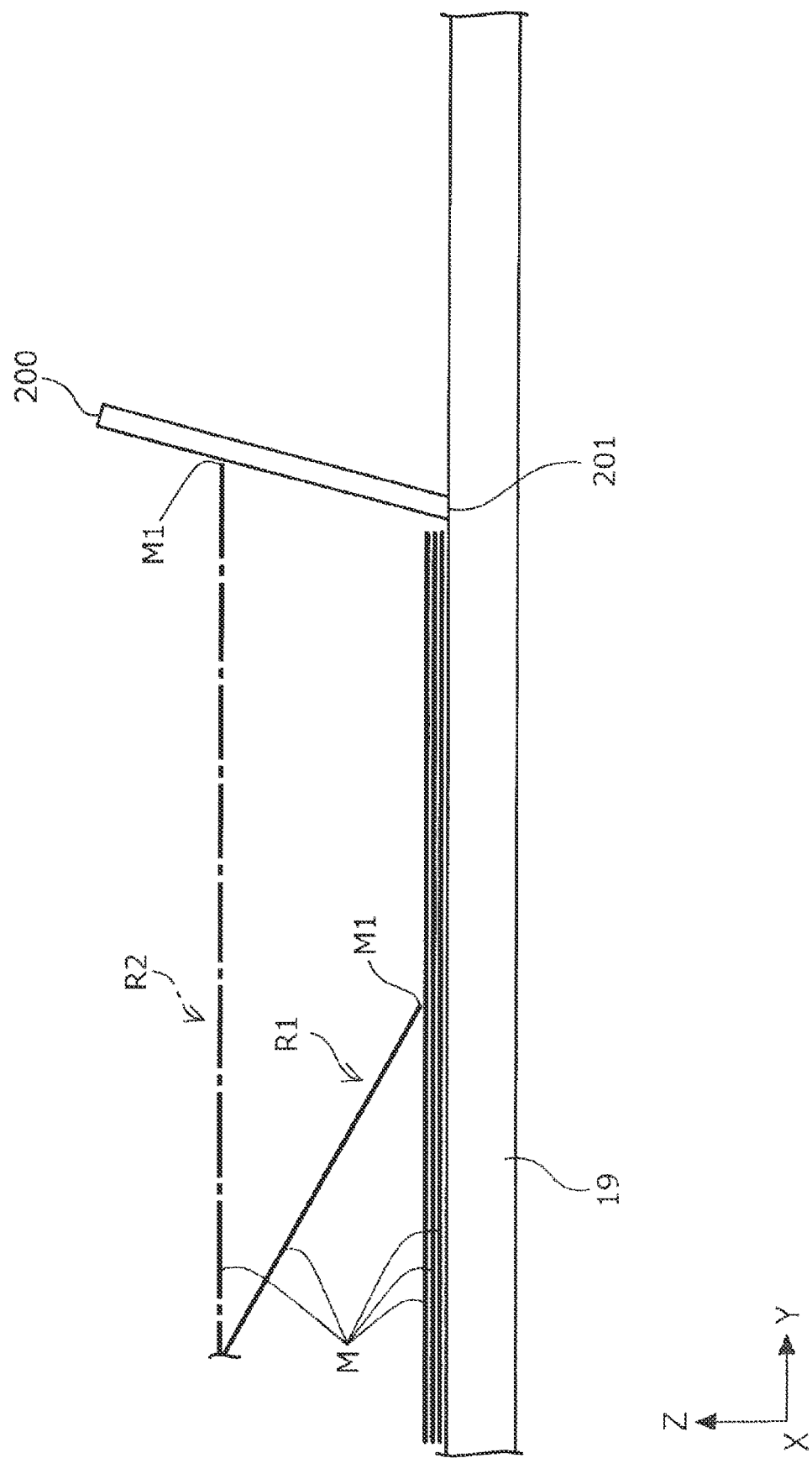
FIG. 12 schematically illustrates a situation in which documents are stacked when an inclination angle of the second stopper is a first angle.

The upper unit 4 includes a front cover 19, and the lower unit 3 includes an upper cover 10. The front cover 19 is provided so as to be rotatable with respect to the lower unit 3 and the upper unit 4 about the rotation shaft 30 and is able to switch, by rotating, between a closed state as illustrated in FIG. 1 and an open state as illustrated in FIG. 2. As illustrated in FIG. 12, when open, the front cover 19 functions as a discharge tray that receives a document M which has been read and discharged. In other words, the front cover 19 serving as the discharge tray also functions as a stacker capable of stacking a plurality of documents M, an image of each of which has been read.

As illustrated in FIG. 2, the upper unit 4 includes, on the upper surface thereof, an operation panel 7 implemented as a user interface via which various reading setting operations and a reading execution operation are performed and on which content of reading settings and the like are displayed. In the present embodiment, the operation panel 7 serving as an operation section is a touch panel on which both display and input are able to be performed and functions as both the operation section for performing various types of operation and a display section for displaying various types of information. Opening the front cover 19 exposes the operation panel 7.

Figure 3:
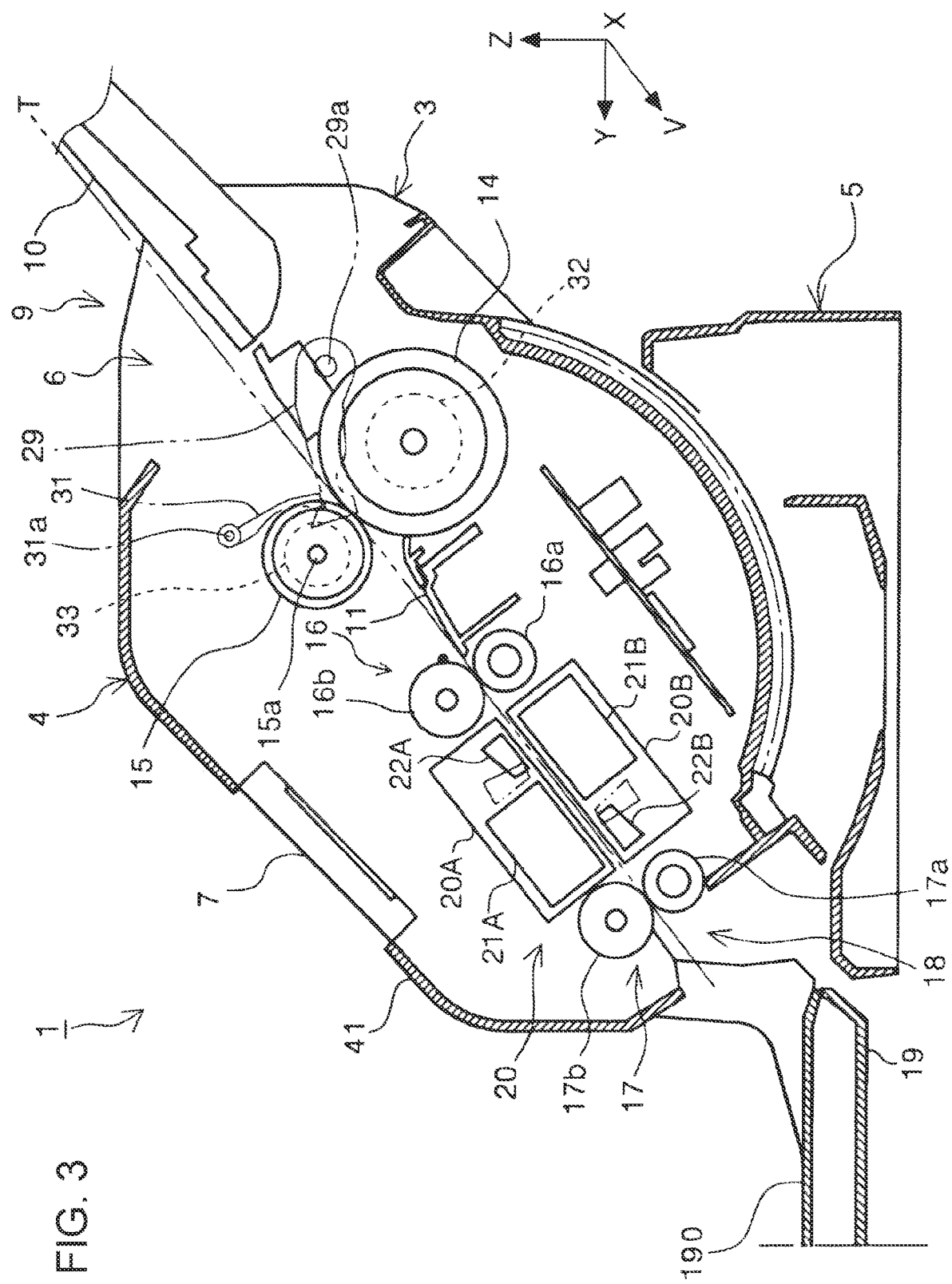
FIG. 3 is a sectional view of a document transporting path of the scanner of Example 1 viewed in a width direction, in which the apparatus main body takes the second posture.
Figure 4A:
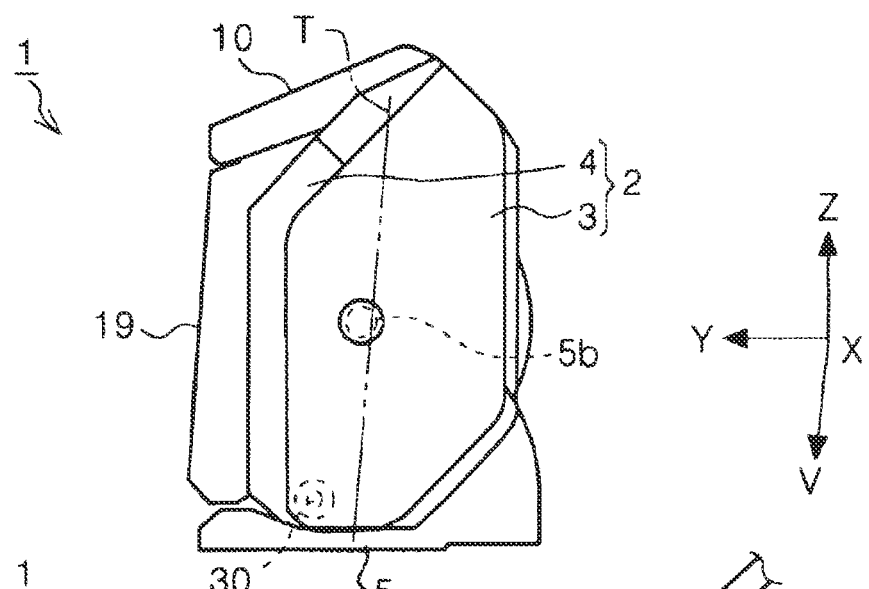
FIGS. 4A to 4C illustrate variations of postures of the apparatus main body.
Figure 4B:
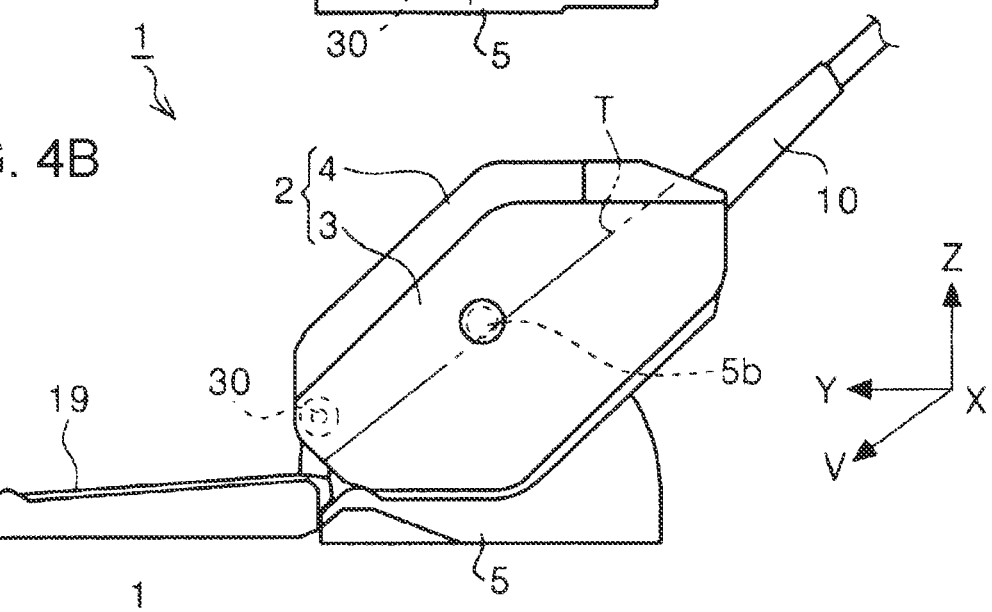
Figure 4C:
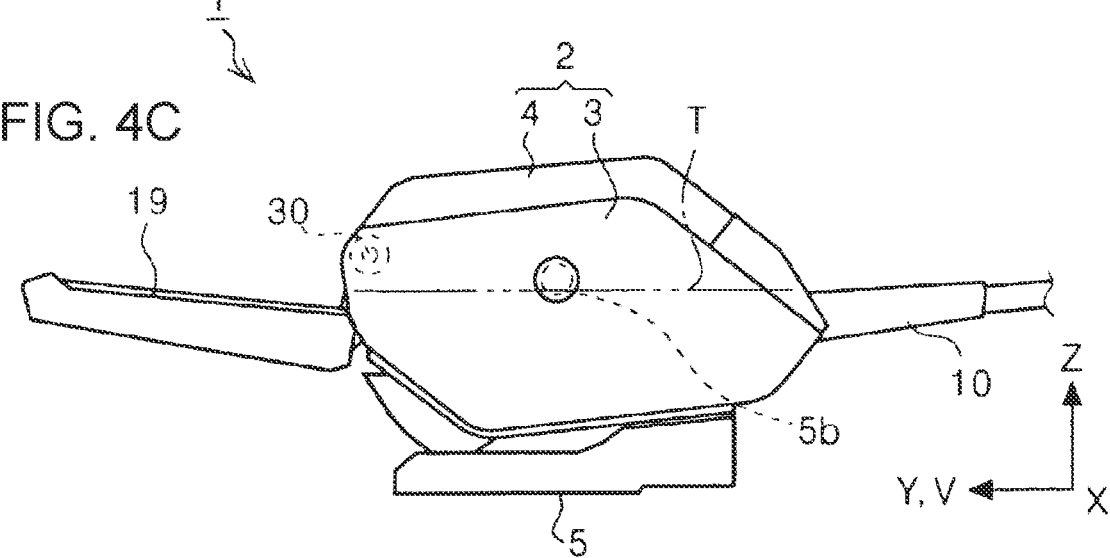

The upper cover 10 provided in the lower unit 3 is provided so as to be rotatable with respect to the lower unit 3 and, by rotating, can take a closed state as illustrated in FIG. 1 and an open state as illustrated in FIGS. 2 and 3. When open, the upper cover 10 functions as a document supporting tray that supports the document M to be fed. As illustrated in FIG. 2, the upper cover 10 is provided with edge guides 12a and 12b that guide the side edges of the document M. A feed opening 6 that leads to the interior of the apparatus main body 2 is provided in an upper portion of the apparatus main body 2, and the document M mounted on the upper cover 10 is transported from the feed opening 6 toward the interior of the apparatus main body 2.

Next, the document transporting path in the scanner 1 will be described with reference to mainly FIG. 3. The document transporting path T is a substantially linear document transporting path formed between the lower unit 3 and the upper unit 4. The document transporting path T extends in a direction closest to vertical when the apparatus main body 2 takes the posture corresponding to when the apparatus is not in use, as illustrated in FIG. 4A. The document transporting path T is at an inclination angle close to 45° when the apparatus main body 2 takes the first reading posture, as illustrated in FIG. 4B. The document transporting path T becomes substantially horizontal when the apparatus main body 2 takes the second reading posture, as illustrated in FIG. 4C.

The upper cover 10 described above is provided in the most upstream portion of the document transporting path T, and a feed roller 14 that transports the document M mounted on the upper cover 10 toward the downstream portion and a separation roller 15 that nips the document M between the separation roller 15 and the feed roller 14 and urges separation of the document M are provided downstream of the upper cover 10. The separation roller 15 is pressed against the feed roller 14 by a load applying unit (not illustrated) and has a rotation shaft 15a to which a braking force is applied.

The feed roller 14 comes into contact with the lowest document M of documents M mounted on the upper cover 10. Thus, when a plurality of documents M are mounted on the upper cover 10, the documents M are sequentially fed downstream starting with the lowermost one.

In the document transporting path T, a flap 31 is provided upstream of the separation roller 15 and, in a feeding-standby state, prevents the document M set on the upper cover 10 from being in contact with the separation roller 15. Before feeding starts, the flap 31 is rotatable about a rotation shaft 31a and has a lower edge that engages a set guide 29, and rotation of the flap 31 in a clockwise direction according to FIG. 3 is stopped. Before feeding starts, the set guide 29 is in a first state in which the set guide 29 supports the document M and thereby prevents the document M from being in contact with the feed roller 14.

Figure 5:
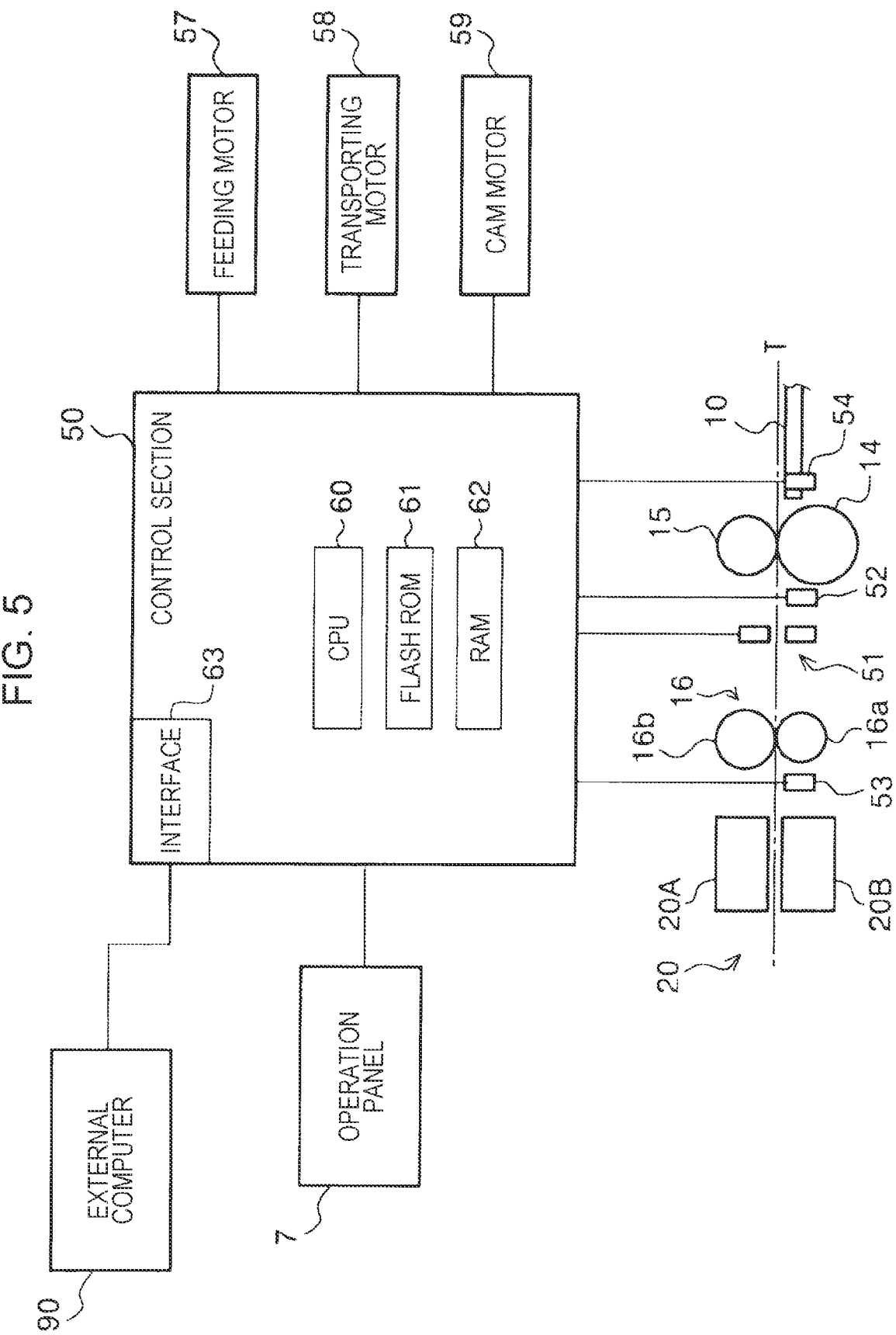
FIG. 5 is a block diagram illustrating a control system of the scanner of Example 1.

When feeding of the document M starts, the set guide 29 rotates about a rotation shaft 29a in a counterclockwise direction according to FIG. 3 in response to power from a transporting motor 58 illustrated in FIG. 5 and is brought into a second state in which the set guide 29 enables the document M to be in contact with the feed roller 14. When the set guide 29 switches from the first state to the second state, the flap 31 is enabled to rotate, and a leading end of a collection of documents mounted on the upper cover 10 comes into contact with the separation roller 15.

Torque in the counterclockwise direction according to FIG. 3, that is, in a direction in which the document M is fed downstream in the feeding direction, is transferred to the feed roller 14 by a feeding motor 57 illustrated in FIG. 5 via a one-way clutch 32. Hereinafter, a rotation direction of the feed roller 14 when the feed roller 14 transports the document M downstream is referred to as a normal rotation direction, and a rotation direction opposite thereto is referred to as a reverse rotation direction. Similarly, a rotation direction of the feeding motor 57 when the document M is transported downstream is also referred to as a normal rotation direction, and a rotation direction opposite thereto is also referred to as a reverse rotation direction.

Since the one-way clutch 32 is provided in a driving-force transferring path between the feed roller 14 and the feeding motor 57, even when the feeding motor 57 rotates in reverse, the feed roller 14 is not rotated in reverse. Moreover, in a state in which the feeding motor 57 is stopped, the feed roller 14 is in contact with the document M to be transported and is able to be driven to rotate in the normal rotation direction.

Next, a torque limiter 33 is provided for the separation roller 15. When no document M exists or a single document M exists between the feed roller 14 and the separation roller 15, torque exerted by the feed roller 14 to cause the separation roller 15 to rotate in the clockwise direction according to FIG. 3 exceeds a torque upper limit of the torque limiter 33, slippage of the torque limiter 33 thus occurs, and the separation roller 15 is driven by the feed roller 14 to rotate.

When the second and subsequent documents M enter between the feed roller 14 and the separation roller 15 in addition to the document M to be fed, slippage occurs between the documents, and the separation roller 15 thus stops. Thereby, the second and subsequent documents M to be multi-fed are returned upstream; that is, multi-feed is prevented.

The upper cover 10, the feed roller 14, and the separation roller 15, which have been described above, and a transporting roller pair 16, a discharging roller pair 17, and the front cover 19 serving as the stacker, which will be described below, constitute a medium-feeding device 9 that feeds a document M, which is an example of the medium. From another viewpoint, the medium-feeding device 9 may be considered as a medium-discharging device that discharges, by using the discharging roller pair 17, a document M to the front cover 19 serving as the stacker and may also be considered as a device obtained by omitting, from the scanner 1, a reading section 20 having a function of reading a document. In addition, even when the reading section 20 having the function of reading a document is provided, the scanner 1 itself may be considered as a medium-feeding device or a medium-discharging device, from the viewpoint of feeding a document.

Next, the transporting roller pair 16, the reading section 20 serving as a reading unit that reads a document image, and the discharging roller pair 17 are provided downstream of the feed roller 14. The transporting roller pair 16 includes a transporting drive roller 16a rotationally driven by the transporting motor 58 and a transporting driven roller 16b driven to rotate. The document M nipped by the feed roller 14 and the separation roller 15 and fed downstream is nipped by the transporting roller pair 16 and transported to a position facing an upper sensor unit 20A and a lower sensor unit 20B which are positioned downstream of the transporting roller pair 16.

The reading section 20 includes the upper sensor unit 20A positioned above the document transporting path T and provided in the upper unit 4 and the lower sensor unit 20B positioned under the document transporting path T and provided in the lower unit 3. The upper sensor unit 20A includes a sensor module 21A, and the lower sensor unit 20B includes a sensor module 21B. In the present embodiment, the sensor modules 21A and 21B are each a contact image sensor module. The upper surface of the document M is read by the sensor module 21A positioned above the document transporting path T, and the lower surface of the document M is read by the sensor module 21B positioned under the document transporting path T. Note that the surface of the upper sensor unit 20A, on which the document is read, and the surface of the lower sensor unit 20B, on which the document is read, are parallel to the document transporting path T.

The upper sensor unit 20A includes a background plate 22A at a position facing the sensor module 21B provided in the lower sensor unit 20B, and the lower sensor unit 20B includes a background plate 22B at a position facing the sensor module 21A provided in the upper sensor unit 20A. The background plates 22A and 22B are each a reference plate read by the facing sensor module for shading correction, and, for example, a resin plate of white, gray, black, or the like or a metal plate painted white, gray, black, or the like may be used.

Each of the background plates 22A and 22B is provided so as to be rotatable in response to power from a motor (not illustrated) and is able to switch, by rotating, between a facing state in which the background plate faces the facing sensor module as indicated by the solid line and a non-facing state in which the facing state is released as indicated by the two-dot chain line. For example, the background plates 22A and 22B are white, are able to provide a white reference value in the facing state, and are able to provide a black reference value in the non-facing state.

After an image on at least one of the upper surface and the lower surface of the document M is read by the reading section 20, the document M is nipped by the discharging roller pair 17 serving as a discharging section positioned downstream of the reading section 20 and is then discharged from a discharge opening 18 to a mounting surface 190 of the front cover 19. The discharging roller pair 17 includes a discharging drive roller 17a rotationally driven by the transporting motor 58 and a discharging driven roller 17b driven to rotate.

Moreover, as illustrated in FIG. 2, a first stopper 100 serving as a regulating section that regulates movement of the document M in the discharging direction so that the document M, the image of which has been read by the reading section 20, is not discharged further than the front cover 19 is formed in the front cover 19 serving as the stacker. As illustrated in FIG. 2, the front cover 19 includes a tray 19A and a tray 19B in which the first stopper 100 is formed and which is able to be drawn out toward the front-end side of the tray 19A. The first stopper 100 is pivotable with respect to the tray 19B about a first pivot shaft 101 extending in the X direction and is able to switch between a stored state in which the first stopper 100 is stored in the front cover 19 and a regulating state in which the first stopper 100 stands upright from the front cover 19 so as to be able to function as the regulating section. Here, the solid line in FIG. 2 indicates the stored state in which the first stopper 100 is stored in the front cover 19, and the broken line in FIG. 2 indicates the regulating state in which the first stopper 100 stands upright from the front cover 19 so as to be able to function as the regulating section.

Furthermore, as illustrated in FIG. 2, a second stopper 200 serving as a regulating section used for the document M, the image of which has been read by the reading section 20, is formed in the tray 19A of the front cover 19 serving as the stacker. The second stopper 200 is pivotable with respect to the tray 19A about a second pivot shaft 201 extending in the X direction and is able to switch between a stored state in which the second stopper 200 is stored in the front cover 19 and a regulating state in which the second stopper 200 stands upright from the front cover 19 so as to be able to function as the regulating section. Here, the solid line in FIG. 2 indicates the stored state in which the second stopper 200 is stored in the front cover 19, and the broken line in FIG. 2 indicates the regulating state in which the second stopper 200 stands upright from the front cover 19 so as to be able to function as the regulating section. Here, each of the first stopper 100 and the second stopper 200 is able to be considered as a lever section pivotable about the pivot shaft. Note that arrangement of the second stopper 200 will be described below in detail.

Next, a control system of the scanner 1 will be described with reference to FIG. 5. A control section 50 performs various types of control of the scanner 1, including control of feeding, transporting, discharging, and reading the document M. A signal is input to the control section 50 from the operation panel 7 serving as the operation section, and a signal for implementing display on the operation panel 7, in particular, implementing a user interface, is transmitted from the control section 50 to the operation panel 7.

The control section 50 controls motors of the feeding motor 57, the transporting motor 58, and a cam motor 59. In the present embodiment, each of the motors is a DC motor. Reading data from the reading section 20 is input to the control section 50, and a signal for controlling the reading section 20 is transmitted from the control section 50 to the reading section 20. Signals from detecting sections of a mounting-detecting section 54, a multi-feed detecting section 51, a first document-detecting section 52, and a second document-detecting section 53 are also input to the control section 50. Furthermore, detected values of rotary encoders (not illustrated) provided in the motors of the feeding motor 57, the transporting motor 58, and the cam motor 59 are also input to the control section 50, and the control section 50 is thereby able to grasp the rotational speed of each of the motors and is also able to grasp the operation amount of a driving target.

The control section 50 includes a CPU 60, flash ROM 61, and RAM 62. The CPU 60 performs various computational processing according to a program stored in the flash ROM 61 and controls the overall operation of the scanner 1. The flash ROM 61, which is an example of a storage unit, is readable-and-writable non-volatile memory. Various kinds of setting information input by a user via the operation panel 7 are also stored in the flash ROM 61. Various kinds of information are temporarily stored in the RAM 62, which is an example of the storage unit. The control section 50 includes an interface 63 and is able to communicate with an external computer 90 via the interface 63.

Next, the arrangement of the second stopper 200 will be described in detail with reference to FIGS. 6 to 13 in addition to FIGS. 1 to 5. Here, a peripheral portion of the second stopper 200 will be described first. As described above, in the open state as illustrated in FIG. 2, the front cover 19 is able to receive, by using the mounting surface 190, the document M discharged by the discharging roller pair 17 and is able to stack the document M on the mounting surface 190. Moreover, in the closed state as illustrated in FIGS. 1 and 3, the mounting surface 190 of the front cover 19 faces a housing section 41 of the upper unit 4. Here, as illustrated in FIGS. 3 and 6, the operation panel 7 is formed in a portion which is depressed with respect to the housing section 41, and the operation panel 7 forms a recess.

Figure 13:
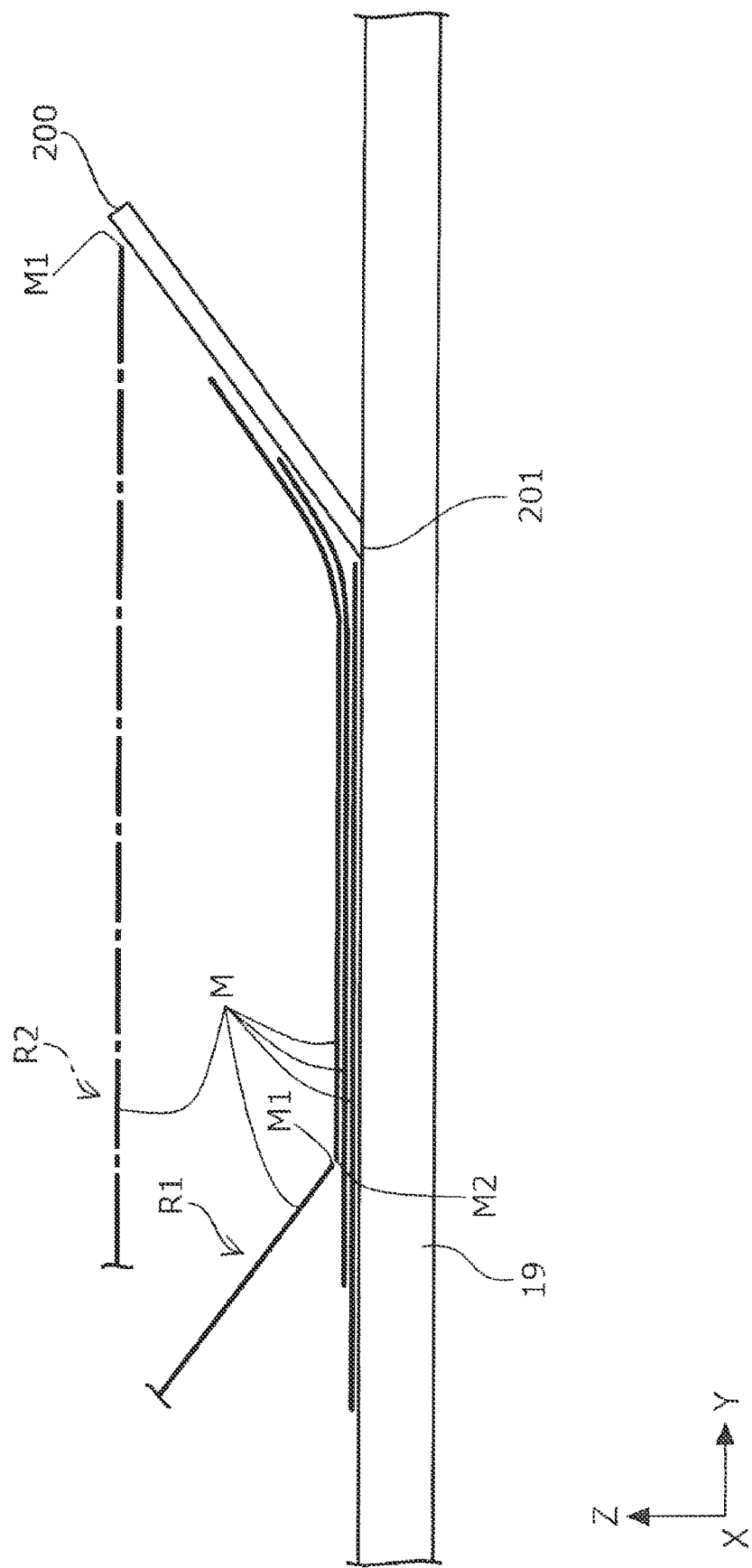
FIG. 13 schematically illustrates a situation in which documents are stacked when the inclination angle of the second stopper is a second angle.

As described above, both the first stopper 100 and the second stopper 200 are able to switch between the regulating state in which the stopper regulates a position of the document M and the stored state in which the stopper is stored in the front cover 19. Here, specifically, the regulating state is a state in which the stopper is able to regulate the position of the document M in the discharging direction by coming into contact with a leading end M1 of the document M in the discharging direction which has been discharged by the discharging roller pair 17 as illustrated in FIGS. 12 and 13. As illustrated in FIG. 2, the second stopper 200 is provided at a position between the discharging roller pair 17 and the first stopper 100 in the discharging direction.

Figure 6:
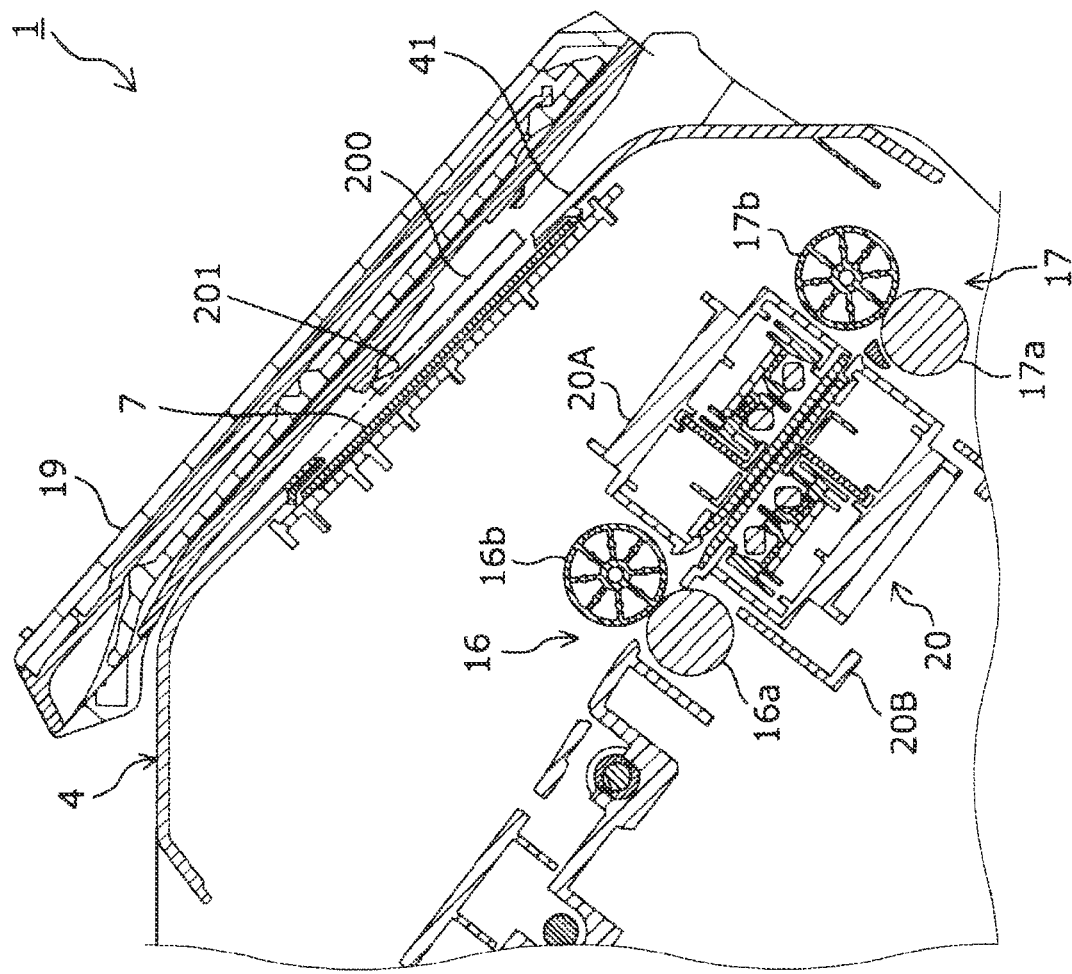
FIG. 6 is a side sectional view of the apparatus main body of the scanner of Example 1 when the front cover is in a closed state and when a second stopper is in a stored state.

FIG. 6 illustrates a state in which the second stopper 200 is in the stored state and in which the front cover 19 is then brought into the closed state. As illustrated in FIG. 6, the second stopper 200 is provided at a position at which, when the front cover 19 is in the closed state, the second stopper 200 faces the operation panel 7 which serves as the recess. Moreover, as illustrated in FIG. 6, when the second stopper 200 is in the stored state and when the front cover 19 is in the closed state, a portion of the second stopper 200 enters the recess. FIG. 6 illustrates a state in which a portion of the second stopper 200 enters a region which is on the operation panel 7 side further than a boundary of the recess indicated by the one-dot chain line.

As in the scanner 1 of the present example, the configuration is suitably such that the second stopper 200 is provided at a position at which, when the front cover 19 is in the closed state, the stopper 200 faces the recess and such that, when the second stopper 200 is in the stored state and when the front cover 19 is in the closed state, at least a portion of the second stopper 200 enters the recess. Such a configuration is provided because it is possible to reduce the size of the scanner 1 by utilizing the recess of the housing section 41. Moreover, in addition to the first stopper 100, the scanner 1 of the present example includes the second stopper 200 between the discharging roller pair 17 and the first stopper 100. Thus, by selectively using the first stopper 100 or the second stopper 200, it is possible to determine, in accordance with the size of the document M to be used, whether to regulate the document M by using the first stopper 100 or by using the second stopper 200. Accordingly, the scanner 1 of the present example is able to stack documents M of various sizes on the front cover 19, which serves as the stacker, with excellent alignment performance.

Note that the configuration may be such that, as in the scanner 1 of the present example, the second stopper 200 is provided at a position at which the second stopper 200 faces the recess when the front cover 19 is in the closed state and such that, when the second stopper 200 is in the stored state and when the front cover 19 is in the closed state, the second stopper 200 does not enter the recess and the position of the recess and a position of a portion of the second stopper 200 face each other. With such a configuration, the recess realizes a clearance between components which is originally required to be ensured, and it is therefore possible to reduce the size of the image reading apparatus.

From the viewpoint of the image reading apparatus, the scanner 1 of the present example includes the reading section 20 which is the reading unit that reads a surface of a medium which is the document M and the medium-discharging device having the above-described configuration. With such a configuration, it is possible to reduce the size of the image reading apparatus by utilizing the recess of the housing section 41 and to stack media which have various sizes and images of which have been read on the stacker with excellent alignment performance.

Here, as described above, the operation panel 7 serving as the operation section of the scanner 1 is provided in the recess of the housing section 41. From the viewpoint of manufacture, for example, simplification and cost reduction of manufacture, when the operation section of the scanner 1 is formed in the housing section 41, it is suitable that the operation section forms the recess in the housing section 41. With such a configuration, the size of the scanner 1 of the present example is reduced by effectively utilizing the recess formed when the operation section is formed in the housing section 41.

Similarly, the configuration may be such that, as in the scanner 1 of the present example, the second stopper 200 is provided at a position at which the second stopper 200 faces the operation panel 7 (operation section) when the front cover 19 is in the closed state and such that, when the second stopper 200 is in the stored state and when the front cover 19 is in the closed state, the second stopper 200 does not enter the operation section and the position of the operation section and a position of a portion of the second stopper 200 face each other. With such a configuration, it is possible to realize a clearance between components which is originally required to be ensured, thus making it possible to reduce the size of the image reading apparatus.

Moreover, the scanner 1 of the present example has a configuration in which, as illustrated in FIG. 7, when the front cover 19 switches from the open state to the closed state while the second stopper 200 is in the regulating state, the second stopper 200 comes into contact with the operation panel 7 forming the recess and prevents the front cover 19 from switching to the closed state. Thus, the scanner 1 of the present example is able to suppress a user from switching the front cover 19 from the open state to the closed state when the user retains the second stopper 200 in the regulating state without bringing the second stopper 200 into the stored state.

However, the configuration is not limited thereto and may be such that, in an instance in which the front cover 19 switches from the open state to the closed state when the second stopper 200 is retained in the regulating state, the second stopper 200 comes into contact with the recess and thereby switches to the stored state. With such a configuration, when a user switches the front cover 19 from the open state to the closed state when retaining the second stopper 200 in the regulating state without bringing the second stopper 200 into the stored state, the second stopper 200 is able to automatically switch to the stored state.

Figure 8:
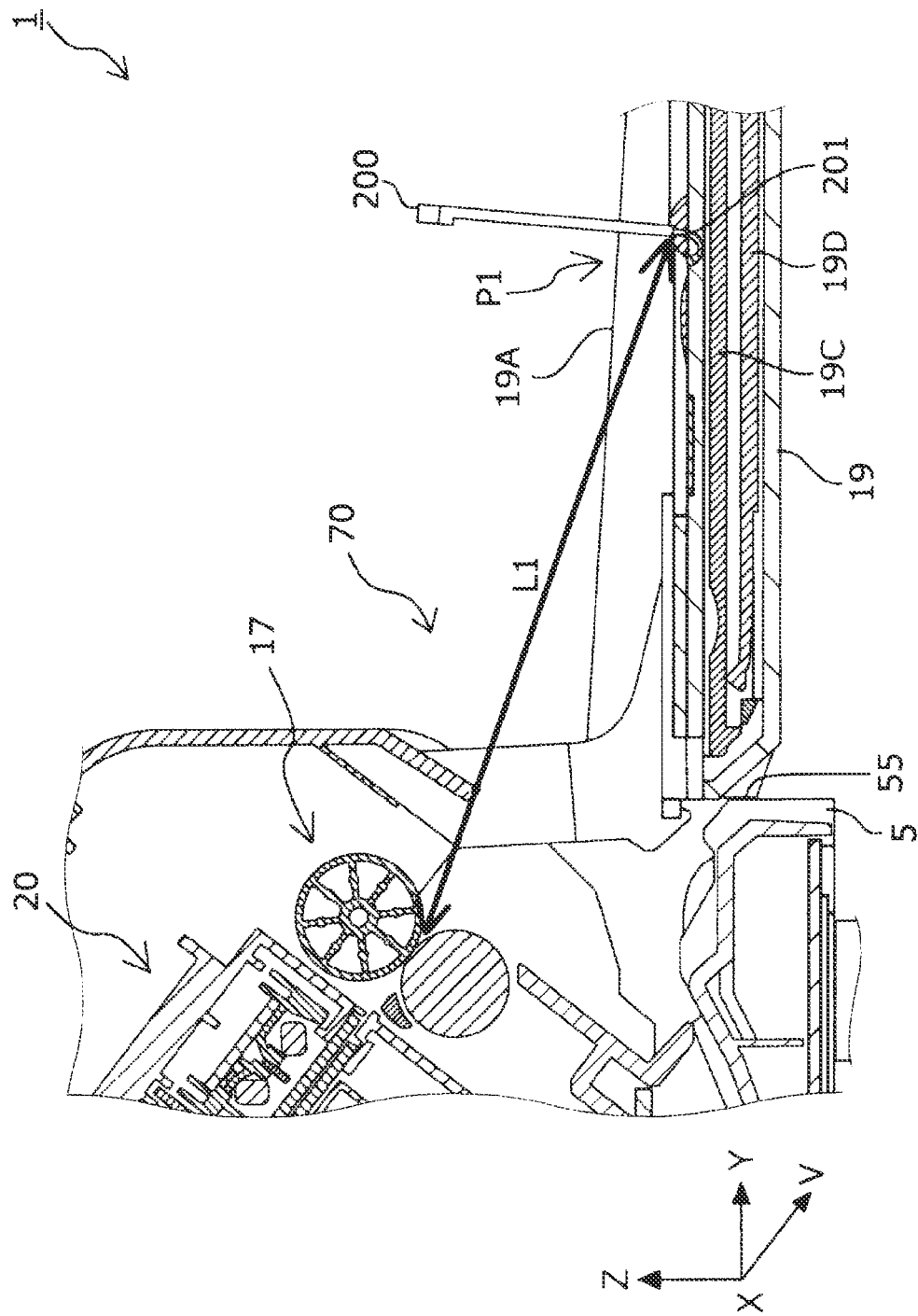
FIG. 8 is a side sectional view of the apparatus main body of the scanner of Example 1, in which a discharging direction is at a first angle, in which the stacker is in the open state, and in which the second stopper is in the regulating state.

Moreover, as described above, as the front cover 19 serving as the stacker, the scanner 1 of the present example includes the tray 19A in which the second stopper 200 is provided and the tray 19B in which the first stopper 100 is provided; that is, the scanner 1 of the present example includes, as the stacker, the tray 19B, which is a first stacker, and the tray 19A, which is a second stacker, the first stopper 100 is provided in the tray 19B, which is the first stacker, and the second stopper 200 is provided in the tray 19A, which is the second stacker. Since the scanner 1 of the present example has such a configuration, it is possible to determine distances from the discharging roller pair 17 to the first stopper 100 and to the second stopper 200 within a wide adjustment range. Note that, although detailed description will be omitted, the scanner 1 of the present example has the configuration in which the tray 19 includes a second tray 19C and a third tray 19D with respect to the tray 19A, which is the first tray, as illustrated in FIG. 8 and in which the second tray 19C and the third tray 19D are able to be slid to be drawn out or stored with respect to the tray 19A. Here, the first stopper 100 is provided in the third tray 19D, and the scanner 1 of the present example may be considered to include, as the stacker, the third tray 19D, which is the first stacker, and the tray 19A, which is the second stacker, the first stopper 100 may be considered to be provided in the third tray 19D, which is the first stacker, and the second stopper 200 may be considered to be provided in the tray 19A, which is the second stacker.

Figure 10:
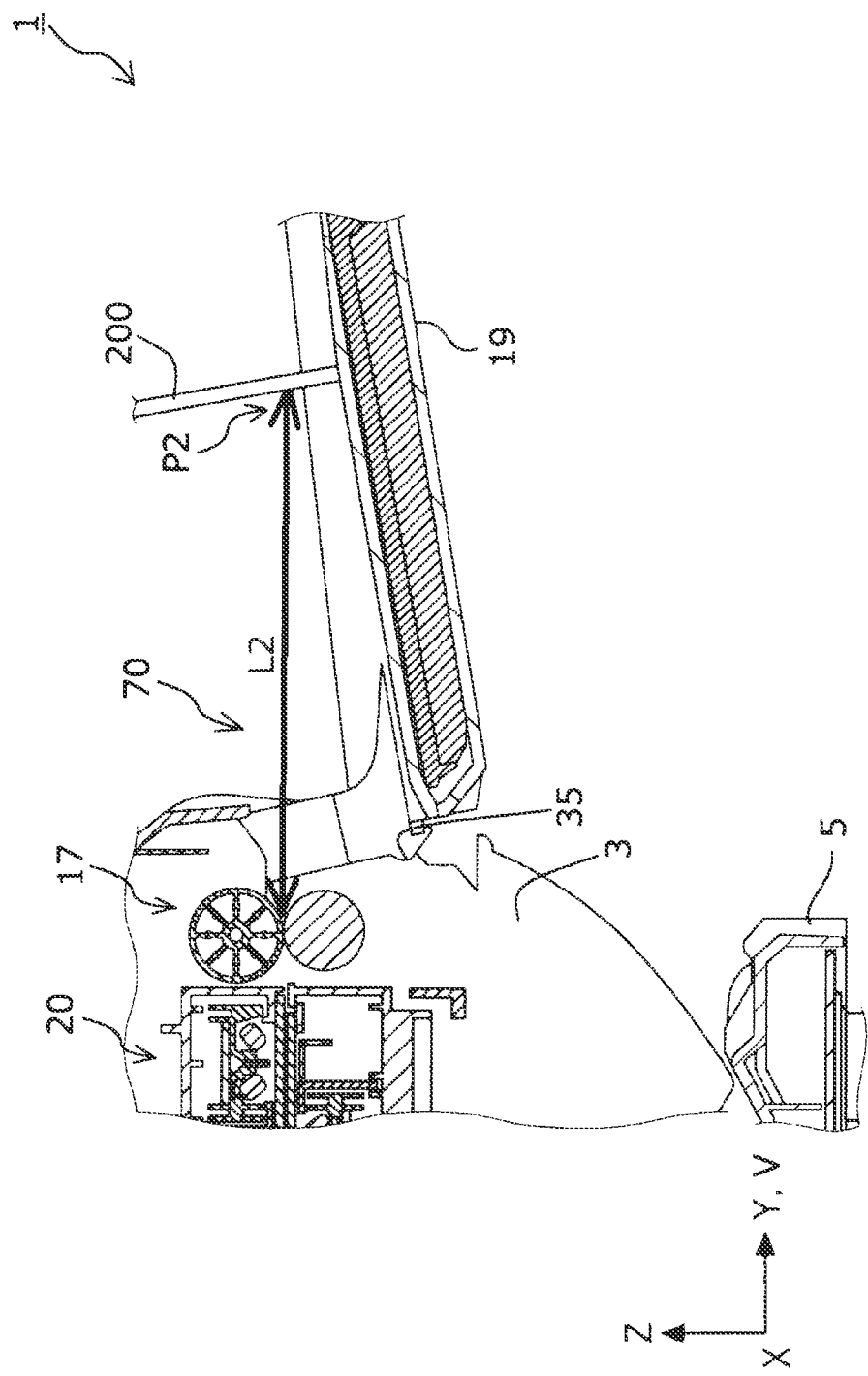
FIG. 10 is a side sectional view of the apparatus main body of the scanner of Example 1, in which the discharging direction is at a second angle, in which the front cover is in the open state, and in which the second stopper is in the regulating state.

Moreover, as described above, the scanner 1 of the present example is able to switch between the first reading posture illustrated in FIG. 4B and the second reading posture illustrated in FIG. 4C. In other words, the scanner 1 of the present example includes a switching section 70 that switches the discharging direction of the document M with respect to the front cover 19 serving as the stacker between a discharging direction R1 inclined at a first angle and indicated in FIGS. 12 and 13 and a discharging direction R2 inclined at a second angle closer to horizontal than the first angle. Moreover, distance L1, which is indicated in FIG. 8, from the discharging roller pair 17 to a regulating position P1, at which the document M is regulated by the stopper 200, at the first angle is longer than distance L2, which is indicated in FIG. 10, from the discharging roller pair 17 to the regulating position P2, at which the document M is regulated by the second stopper 200, at the second angle. Note that "first angle" and "second angle" here are angles when viewed in the X direction which is an intersecting direction intersecting the discharging direction of the document M.

As described above, the scanner 1 of the present example is able to switch the angle of the discharging direction between the first angle and the second angle closer to horizontal than the first angle and is therefore able to switch the angle of the discharging direction between the first angle and the second angle in accordance with a type of a document M to be used, thus making it possible to improve stackability of documents M. Moreover, in the scanner 1 of the present example, distance L1, which is at the first angle, from the discharging roller pair 17 to the regulating position at which the document M is regulated by the second stopper 200 is longer than distance L2, which is at the second angle, from the discharging roller pair 17 to the regulating position at which the document M is regulated by the second stopper 200. As in the present example, by changing the angle of the discharging direction of the document M with respect to the front cover 19 serving as the stacker by the switching section 70, it is possible to appropriately set a distance to a position at which the leading end M1 of the discharged document M comes into contact with the second stopper 200, thus making it possible to improve stackability obtained by the second stopper 200.

Figure 9:
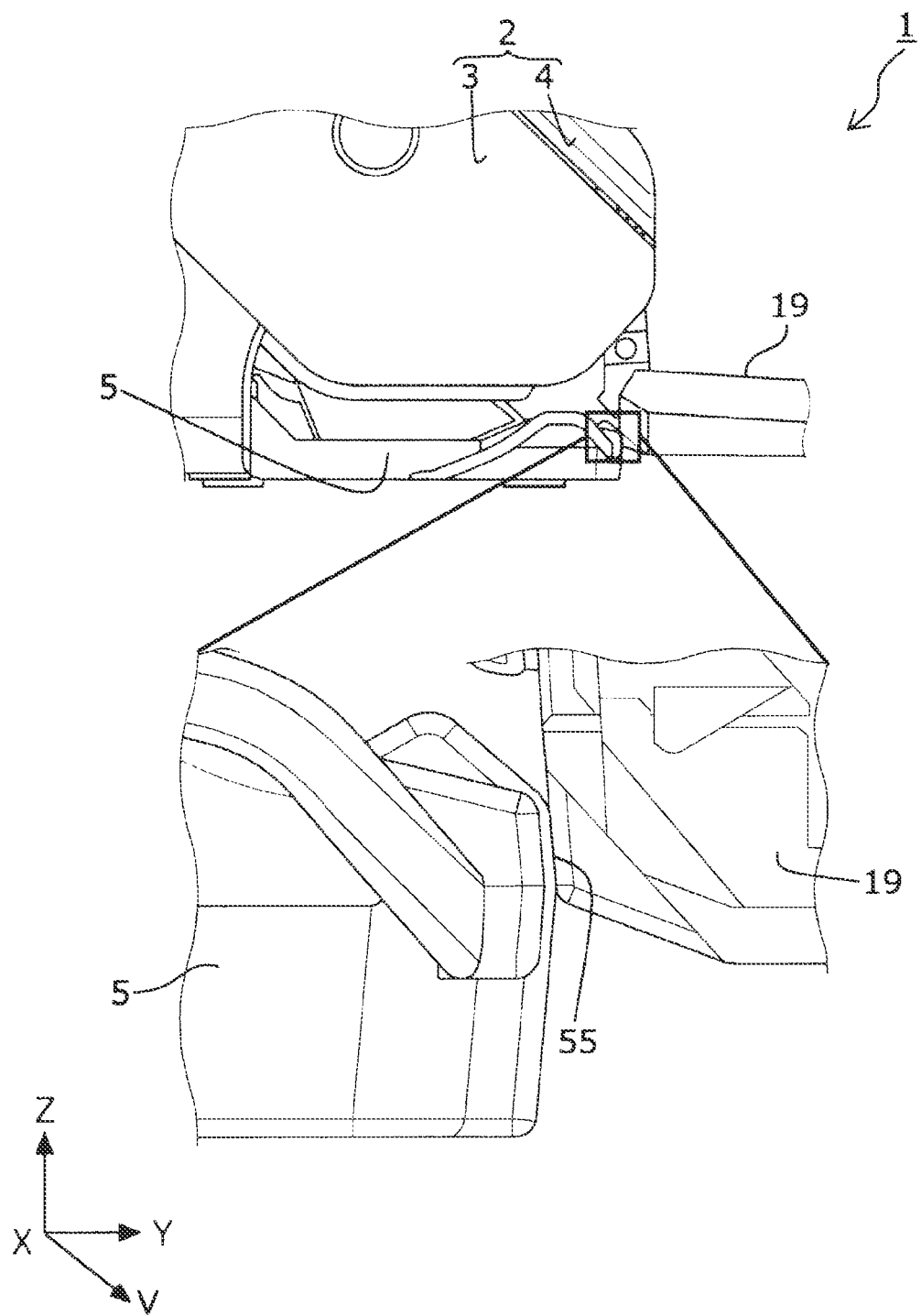
FIG. 9 is a side view of the apparatus main body of the scanner of Example 1 with a partially enlarged view thereof illustrating a contact portion of a housing section and the front cover when the discharging direction is at the first angle and when the front cover is in an open state.
Figure 11:
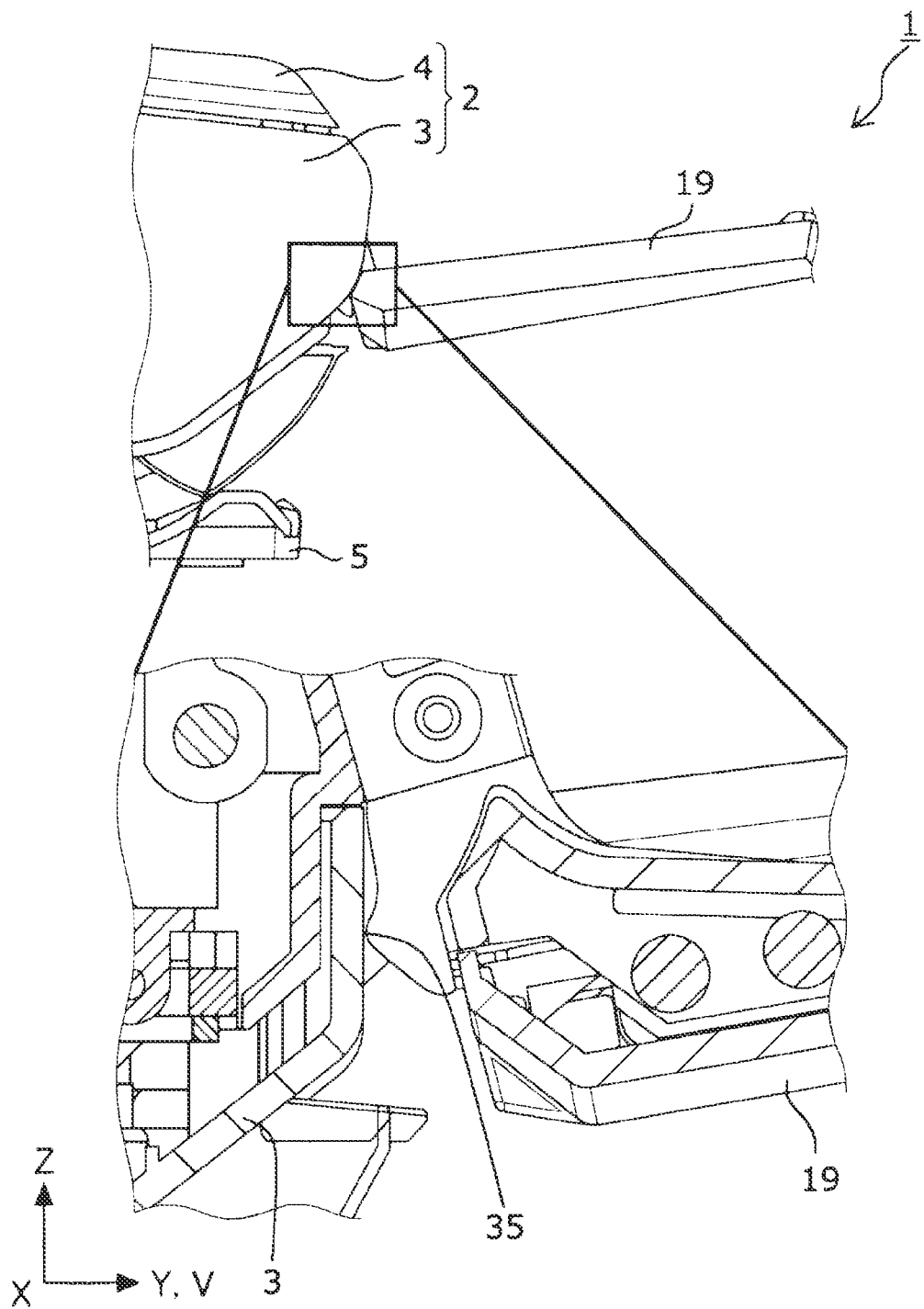
FIG. 11 is a side view of the apparatus main body of the scanner of Example 1 with a partially enlarged view thereof illustrating a contact portion of the housing section and the front cover when the discharging direction is at the second angle and when the front cover is in the open state.

Here, when the scanner 1 of the present example takes the first reading posture with which the discharging direction of the document M is at the first angle, the front cover 19 is in contact with a contact section 55 of the supporting base 5 as illustrated in FIG. 9. On the other hand, when the scanner 1 takes the second reading posture with which the discharging direction of the document M is at the second angle, the front cover 19 is in contact with a contact section 35 of the lower unit 3 in the apparatus main body 2 as illustrated in FIG. 11. In this manner, the front cover 19 is in contact with a different portion between the first reading posture and the second reading posture.

Note that the scanner 1 of the present example has the configuration in which a user is able to manually change an angle of the second stopper 200 in the regulating state with respect to the front cover 19. Thus, when the discharging direction of the document M is at the first angle, it is possible to set the angle of the second stopper 200 with respect to the front cover 19 to be a steep angle as illustrated in FIG. 12, and when the discharging direction of the document M is at the second angle, it is possible to set the angle of the second stopper 200 with respect to the front cover 19 to a gentle angle as illustrated in FIG. 13. The advantage of changing the angle will be described below.

As illustrated in FIG. 12, in an instance in which the angle of the second stopper 200 with respect to the front cover 19 is steep, when the discharging direction of the document M is the discharging direction R1 inclined at the first angle, the document M discharged from the discharging roller pair 17 is stacked on the front cover 19 without any problem. However, when the discharging direction of the document M is the discharging direction R2 inclined at the second angle, since distance L2 from the discharging roller pair 17 to the regulating position at which the document M is regulated by the second stopper 200 is short as described above, the leading end M1 of the document M may come into contact with the second stopper 200 before the document M is discharged from the discharging roller pair 17, and a discharge defect may occur.

On the other hand, in an instance in which the angle of the second stopper 200 with respect to the front cover 19 is gentle as illustrated in FIG. 13, when the discharging direction of the document M is the discharging direction R2 inclined at the second angle, since the regulating position at which the document M is regulated by the second stopper 200 becomes far from the discharging roller pair 17, the document M discharged from the discharging roller pair 17 is stacked on the front cover 19 without any problem. However, when the discharging direction of the document M is the discharging direction R1 inclined at the first angle, since documents M are stacked such that the documents M deviate downward, a leading end M1 of a document M discharged from the discharging roller pair 17 may be readily caught by a trailing end M2 of a document M which has already been stacked on the front cover 19, and a discharge defect or a stacking defect may occur.

Therefore, when the discharging direction of the document M is at the first angle, the angle of the second stopper 200 with respect to the front cover 19 is suitably set to be a steep angle, and when the discharging direction of the document M is at the second angle, the angle of the second stopper 200 with respect to the front cover 19 is suitably set to a gentle angle. Note that, although the scanner 1 of the present example has the configuration in which a user is able to manually change the angle of the second stopper 200 in the regulating state with respect to the front cover 19, the configuration may be such that, when the posture is switched between the first reading posture and the second reading posture, the angle of the second stopper 200 in the regulating state with respect to the front cover 19 is able to be automatically changed.

EXAMPLE 2

The scanner 1 of Example 2 which is able to automatically change the angle of the second stopper 200 in the regulating state with respect to the front cover 19 by switching between the first reading posture and the second reading posture will be described below with reference to FIGS. 14 and 15. The scanner 1 of the present example has a configuration similar to that of the scanner 1 of Example 1, except that an angle adjusting section 210 which is able to automatically change the angle of the second stopper 200 in the regulating state with respect to the front cover 19 is included. Thus, the scanner 1 of the present example has features similar to those of the scanner 1 of Example 1 except for the following difference from the scanner 1 of Example 1.

Figure 14:
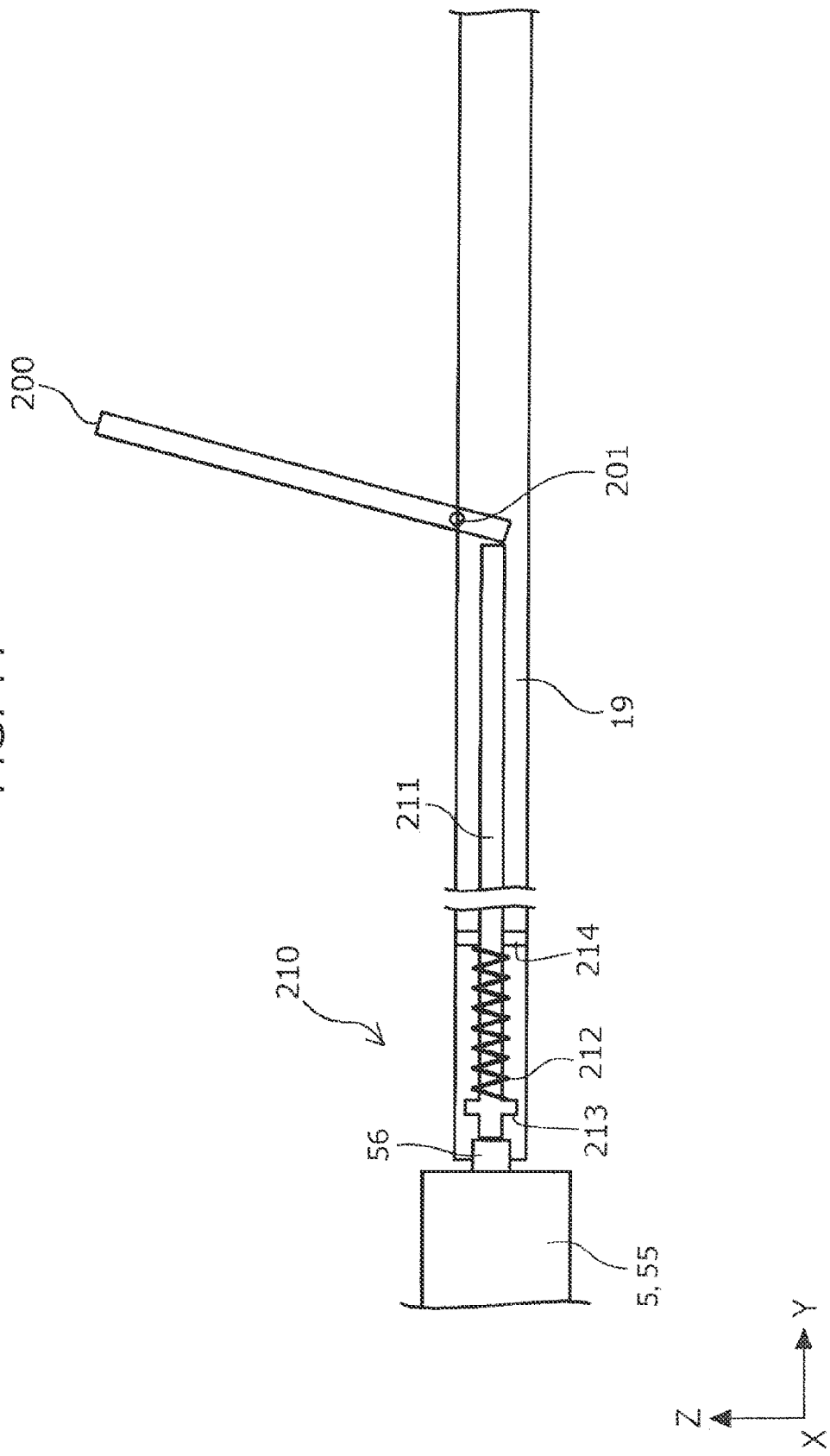
FIG. 14 schematically illustrates an angle adjusting section of a second stopper in a scanner of Example 2 and illustrates a state in which an angle of the second stopper with respect to a stacker is a first angle.
Figure 15:
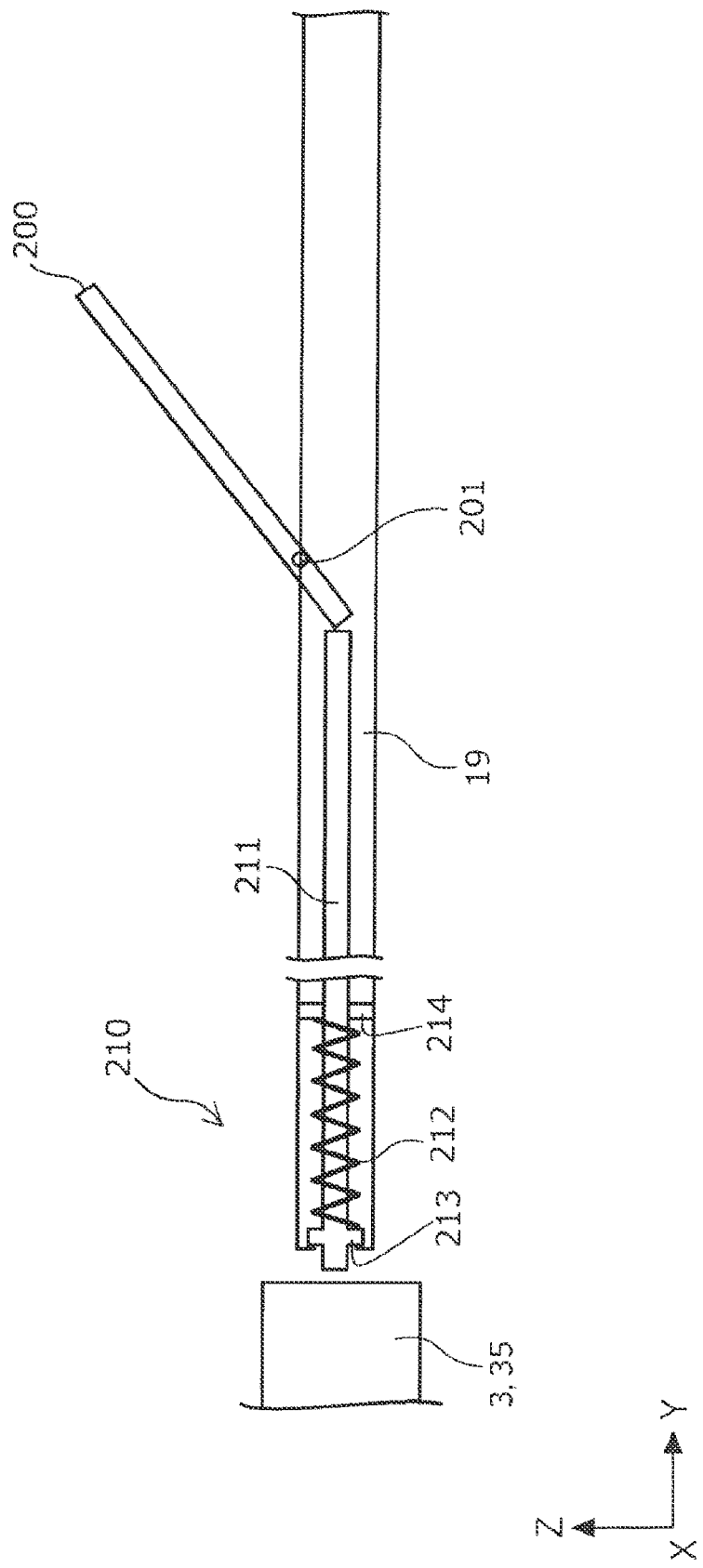
FIG. 15 schematically illustrates the angle adjusting section of the second stopper in the scanner of Example 2 and illustrates a state in which the angle of the second stopper with respect to the stacker is a second angle.

As illustrated in FIGS. 14 and 15, the scanner 1 of the present example includes, inside the front cover 19, the angle adjusting section 210 that includes a wall section 214, a bar-shaped member 211 which passes through the wall section 214, is provided with a spring fixing section 213, and is in contact with the second stopper 200, and a spring 212 provided between the wall section 214 and the spring fixing section 213. Moreover, as illustrated in FIG. 14, a protrusion 56 that is inserted into the front cover 19 and comes into contact with the bar-shape member 211 is provided in the contact section 55 of the supporting base 5. On the other hand, as illustrated in FIG. 15, no protrusion is provided in the contact section 35 of the lower unit. Thus, as is clear from comparison between FIGS. 14 and 15, when the discharging direction of the document M is at the first angle as illustrated in FIG. 14, the second stopper 200 is pushed by the bar-shaped member 211, and the angle of the second stopper 200 with respect to the front cover 19 becomes steep, and when the discharging direction of the document M is at the second angle as illustrated in FIG. 15, the second stopper 200 is not pushed by the bar-shaped member 211, and the angle of the second stopper 200 with respect to the front cover 19 becomes gentle.

Here, the scanner 1 of the present example includes the switching section 70 that switches the angle of the discharging direction of the document M with respect to the front cover 19 between the first angle and the second angle. Moreover, the scanner 1 includes the second pivot shaft 201 which is provided in the intersecting direction intersecting the discharging direction and which serves as a pivot shaft of the second stopper 200 and the angle adjusting section 210 that adjusts the inclination angle of the second stopper 200 with respect to the front cover 19 when viewed in the intersecting direction. Here, the angle adjusting section 210 is able to adjust the inclination angle to a gentle angle in conjunction with switching of the angle of the discharging direction of the document M from the first angle to the second angle which is performed by the switching section 70.

The scanner 1 of the present example is able to switch the angle of the discharging direction between the first angle and the second angle and is therefore able to switch the angle of the discharging direction between the first angle and the second angle in accordance with a type of the document M, thus making it possible to improve stackability of documents M. Moreover, the angle adjusting section adjusts the inclination angle to a gentle angle in conjunction with switching of the angle of the discharging direction from the first angle to the second angle which is performed by the switching section 70. It is therefore possible to suppress a stacking defect of documents M from occurring when the distance to the regulating position at which the documents M are regulated by the second stopper 200 becomes short due to switching to the second angle.

EXAMPLE 3

The scanner 1 of Example 3 will be described below with reference to FIGS. 16 and 17. The scanner 1 of the present example has a configuration similar to that of the scanner 1 of Example 1, except that a moving section 220 which automatically moves a position of the second stopper 200 in the front cover 19 is included. Thus, the scanner 1 of the present example has features similar to those of the scanner 1 of Example 1 except for the following difference from the scanner 1 of Example 1.

Figure 16:
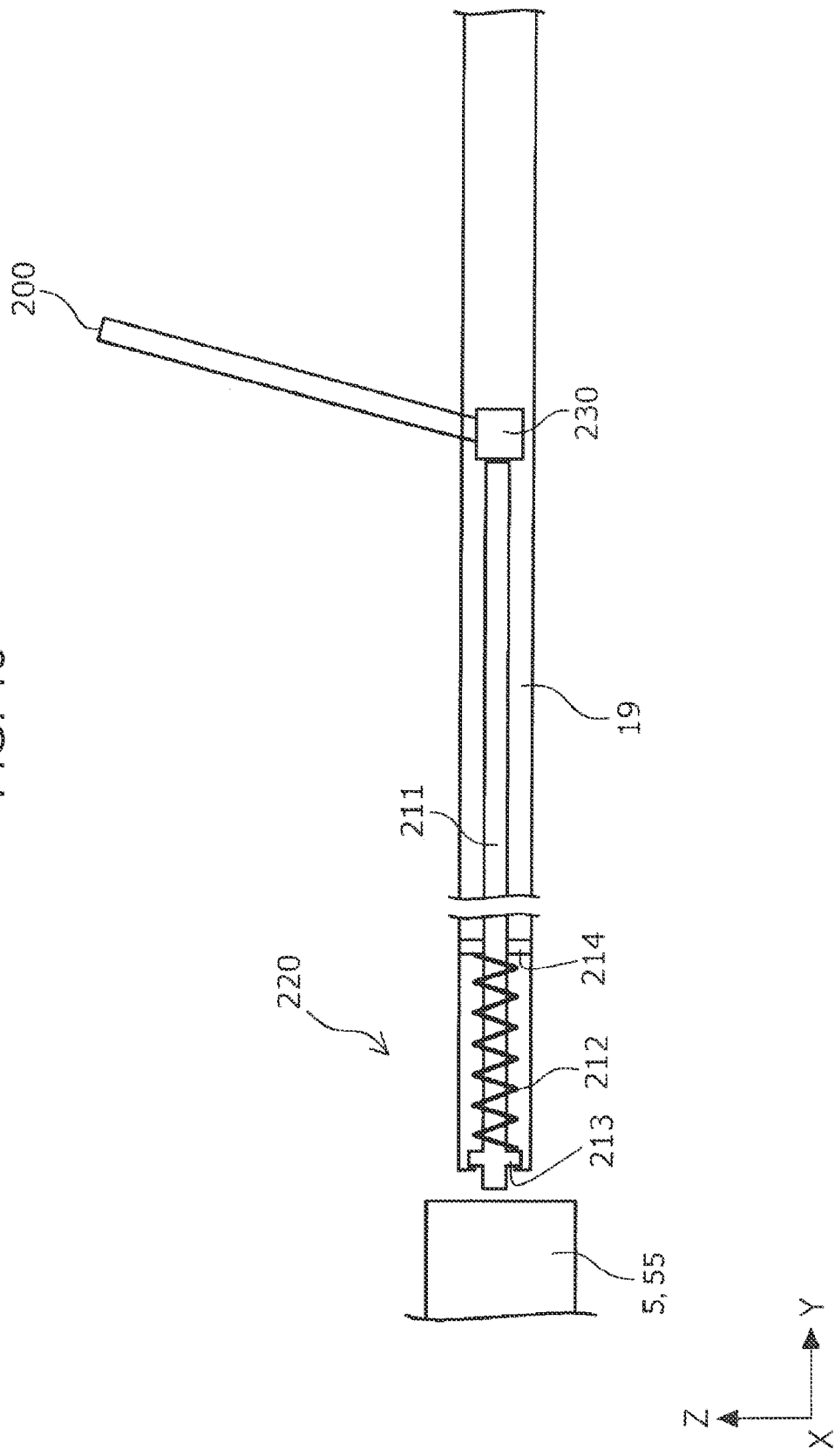
FIG. 16 schematically illustrates a moving section of a second stopper in a scanner of Example 3 and illustrates a state in which the second stopper is on a base-edge side.

As illustrated in FIGS. 16 and 17, the scanner 1 of the present example includes the moving section 220 having a configuration similar to that of the angle adjusting section 210 of Example 2. Instead of the second pivot shaft 201, the second stopper 200 is provided with a coupling section 230 coupled to the bar-shaped member 211. Moreover, as illustrated in FIG. 16, no protrusion which is inserted into the front cover 19 and comes into contact with the bar-shape member 211 is provided in the contact section 55 of the supporting base 5. On the other hand, as illustrated in FIG. 17, a protrusion 36 which is inserted into the front cover 19 and comes into contact with the bar-shape member 211 is provided in the contact section 35 of the lower unit. With such a configuration, when the scanner 1 of the present example takes the second reading posture in which the discharging direction of the document M is at the second angle as illustrated in FIG. 17, the second stopper 200 moves toward the front-edge side of the front cover 19 further than the first reading posture in which the discharging direction of the document M is at the first angle as illustrated in FIG. 16.

As described above, the scanner 1 of the present example includes the moving section 220 that moves the position of the second stopper 200 in the front cover 19. It is therefore possible to move the second stopper 200 to an appropriate position, thus making it possible to stack documents M on the front cover 19 with excellent alignment performance.

It is needless to say that the disclosure is not limited to the embodiments described above, that various modifications can be made within the scope of the disclosure described in the claims, and that these modifications are also included within the scope of the disclosure. Moreover, the medium-feeding device 9 is applied to the scanner in the above-described embodiments but is applicable also to a recording apparatus, for example, a printer, which includes a recording head for performing recording on a recording sheet which is an example of the medium.

What is claimed is:

1. A medium-discharging device comprising:
a housing section including a recess;
a discharging section that discharges a medium;
a stacker that is configured to be opened/closed with respect to the housing section and that, in an open state, receives, on a mounting surface, the medium discharged from the discharging section and stacks the medium on the mounting surface and, in a closed state, has the mounting surface facing the housing section; and
a stopper provided in the stacker and configured to switch between a regulating state in which the stopper is in contact with a leading end of the medium discharged from the discharging section in a discharging direction and thereby regulates a position of the medium in the discharging direction and a stored state in which the stopper is stored in the stacker, wherein
at least a portion of the stopper enters the recess when the stopper is in the stored state and when the stacker is in the closed state.

2. The medium-discharging device according to claim 1, wherein
the stopper includes
a first stopper provided in the stacker and configured to switch between a regulating state in which the first stopper is in contact with the leading end of the medium discharged from the discharging section in the discharging direction and thereby regulates the position of the medium in the discharging direction and a stored state in which the first stopper is stored in the stacker and
a second stopper provided in the stacker and configured to switch between a regulating state in which the second stopper is in contact with the leading end of the medium discharged from the discharging section in the discharging direction and thereby regulates the position of the medium in the discharging direction and a stored state in which the second stopper is stored in the stacker,
the second stopper is provided at a position which is between the discharging section and the first stopper in the discharging direction and at which the second stopper faces the recess when the stacker is in the closed state, and
at least a portion of the second stopper enters the recess when the second stopper is in the stored state and when the stacker is in the closed state.

3. The medium-discharging device according to claim 2, wherein
in an instance in which the stacker is switched from the open state to the closed state when the second stopper is retained in the regulating state, the second stopper comes into contact with the recess and prevents the stacker from being switched to the closed state.

4. The medium-discharging device according to claim 2, wherein
in an instance in which the stacker is switched from the open state to the closed state when the second stopper is retained in the regulating state, the second stopper comes into contact with the recess and thereby switches to the stored state.

5. The medium-discharging device according to claim 2, wherein
the stacker includes a first stacker and a second stacker, the first stopper is provided in the first stacker, and the second stopper is provided in the second stacker.

6. The medium-discharging device according to claim 2, further comprising
a switching section that switches an angle of the discharging direction with respect to the stacker between a first angle and a second angle closer to horizontal than the first angle, wherein
the switching section changes, by switching the angle of the discharging direction between the first angle and the second angle, a distance from the discharging section to a regulating position at which the medium is regulated by the second stopper.

7. The medium-discharging device according to claim 6, wherein
a distance from the discharging section to the regulating position at which the medium is regulated by the second stopper at the first angle is longer than a distance from the discharging section to the regulating position at which the medium is regulated by the second stopper at the second angle.

8. The medium-discharging device according to claim 7, further comprising
a moving section that moves a position of the second stopper in the stacker.

9. The medium-discharging device according to claim 2, further comprising:
a switching section that switches an angle of the discharging direction with respect to the stacker between a first angle and a second angle closer to horizontal than the first angle;
a pivot shaft of the second stopper which is provided in an intersecting direction intersecting the discharging direction; and
an angle adjusting section that adjusts an inclination angle of the second stopper with respect to the stacker when viewed in the intersecting direction, wherein
the angle adjusting section adjusts the inclination angle to a gentle angle in conjunction with switching of the angle of the discharging direction from the first angle to the second angle which is performed by the switching section.

10. The medium-discharging device according to claim 1, wherein
an operation section of the medium-discharging device is provided in the recess.

11. An image reading apparatus comprising:
a reading unit that reads a surface of a medium; and
the medium-discharging device according to claim 1.

* * * * *